United States Patent [19]
Tani et al.

[11] Patent Number: 5,108,965
[45] Date of Patent: Apr. 28, 1992

[54] METHOD OF MANUFACTURING A SILICON CARBIDE-BASED MATERIAL

[75] Inventors: Toshihiko Tani, Aichi; Shigetaka Wada, Mie, both of Japan

[73] Assignee: Kabushiki Kaisha Toyota Chuo Kenkyusho, Aichi, Japan

[21] Appl. No.: 747,499

[22] Filed: Aug. 19, 1991

Related U.S. Application Data

[63] Continuation of Ser. No. 230,959, Aug. 11, 1988, abandoned.

[30] Foreign Application Priority Data

| | | | |
|---|---|---|---|
| Aug. 11, 1987 | [JP] | Japan | 62-200374 |
| Sep. 2, 1987 | [JP] | Japan | 62-220053 |
| Feb. 26, 1988 | [JP] | Japan | 63-45637 |
| May 10, 1988 | [JP] | Japan | 63-112963 |

[51] Int. Cl.$^5$ .................................. C04B 35/56
[52] U.S. Cl. ......................... 501/92; 501/96; 501/98
[58] Field of Search ......................... 501/92, 96, 98

[56] References Cited

U.S. PATENT DOCUMENTS

| | | | |
|---|---|---|---|
| 4,327,186 | 4/1982 | Murata et al. | |
| 4,460,697 | 7/1984 | Hara et al. | 501/92 X |
| 4,500,643 | 2/1985 | Gesing et al. | 501/98 X |
| 4,636,481 | 1/1987 | Kida et al. | |
| 4,698,319 | 10/1987 | Ray | 501/96 X |
| 4,705,761 | 11/1987 | Kosugi | 501/92 X |
| 4,753,903 | 6/1988 | Saito | 501/92 X |
| 4,837,231 | 6/1989 | Endo et al. | 501/92 X |
| 5,034,355 | 7/1991 | Tani et al. | 501/92 |

FOREIGN PATENT DOCUMENTS 60-186468 9/1985 Japan.

OTHER PUBLICATIONS

*Advanced Ceramic Materials*, vol. 1, No. 4 (1986), pp. 341-345, "SiC—ZrB$_2$ Electroconductive Ceramic Composite"; Ryutarou Jimbou, et al.

Primary Examiner—Karl Group
Attorney, Agent, or Firm—Oblon, Spivak, McClelland, Maier & Neustadt

[57] ABSTRACT

A composition of raw materials comprising silicon carbide, a substance containing at least one of Group IVa to VIa elements except any boride thereof, and a substance containing boron except any of the borides of Group IVa to VIa elements, and further containing, if required, carbon, or an organic compound which produces carbon as a result of thermal decomposition, or both, is fired to manufacture a silicon carbide-based material in which a boride of at least one of the elements of Groups IVa to VIa of the periodic table is dispersed. The silicon carbide-based material can be manufactured without using any of the borides of Group IVa to VIa elements as a starting material.

18 Claims, 6 Drawing Sheets

- ● SiC
- ▼ ZrO₂ (MONOCLINIC TYPE)
- ▽ ZrO₂ (TETRAGONAL TYPE)
- ■ B₄C

- ● SiC
- ◆ ZrB₂
- ▲ C

- SiC
- Nb₂O₅
- B₄C

- SiC
- NbB₂
- C

METHOD OF MANUFACTURING A SILICON CARBIDE-BASED MATERIAL

This application is a continuation of application Ser. No. 07/230,959, filed on Aug. 11, 1988, now abandoned.

BACKGROUND OF THE INVENTION

1. Field of the Invention

This invention relates to a method of manufacturing silicon carbide (SiC) based composite materials which comprise silicon carbide reinforced by the dispersion therein of a boride of any element of Groups IVa to VIa of the periodic table, and also relates to a composition of raw materials therefor.

2. Description of the Prior Art

Attempts have been made to use silicon carbide as a material for high temperature engineering components because of its excellent mechanical and chemical properties at an elevated temperature. It is particularly worthy of notice that silicon carbide does not show any reduction of strength even at a temperature of 1500° C. or above, but even tends to have a higher strength than at an ordinary room temperature, if a sintering additive comprising boron or a boron compound is employed, as described in Japanese Patent Publications Nos. 32035/1982 and 34147.1984. It is, therefore, expected to be a good material for gas turbine engines, or other engineering components operating at an elevated temperature of 1400° C. or above.

The greatest drawback of silicon carbide is, however, its low fracture toughness ($K_{IC}$ value) For example, a hot pressed product of SiC containing boron and a product of SiC made by pressureless sintering and containing boron and carbon have a $K_{IC}$ value of 2.7 to 2.8 MPa·ml$^{\frac{1}{2}}$ as determined by the IM (indentation microfracture) method. This value is only a half of the $K_{IC}$ value of a sintered product of Si$_3$N$_4$ (5 to 7 MPa·ml$^{\frac{1}{2}}$). This is due to the fact that the fracture of a product of SiC made by adding boron proceeds transgranularly and produces only a small surface area, resulting in the consumption of only a small amount of fracture energy. It is known that a SiC-based material obtained by using Al$_2$O$_3$ as a sintering additive has a $K_{IC}$ value exceeding 6 MPa·ml$^{\frac{1}{2}}$, as its fracture proceeds mainly through the grain boundary (Suzuki: Speech at Fourth Basic Debate on High Temperature Materials, 1984, pages 31 to 34). This material, however, shows a reduction of strength at a high temperature exceeding 1200° C. and has, therefore, only a limited scope of applicability as a material for gas turbine engines, etc.

Attempts have been made to improve the fracture toughness of a SiC-based material by dispersing particles of another substance therein. One of these attempts employs borides of elements of Groups IVa to VIa of the periodic table, e.g. titanium diboride (TiB$_2$) and zirconium diboride (ZrB$_2$), as described in Japanese Patent Applications laid open under Nos. 27975/1982, 223272/1984 and 186468/1985, Am. Ceram. Soc. Bull., vol. 66, No. 2, 1987, pages 322 to 324 and 325 to 329, and Journal of the Ceramic Society of Japan, Vol. 93, No. 3, 1985. pages 123 to 129. The SiC-based materials containing particles of borides of these metal elements have not only a high value of fracture toughness, but also high electrical conductivity. These materials are manufactured by, for example, mixing SiC, boride particles and a sintering additive, molding the mixture and sintering it, or hot pressing it.

The known methods, however, employ a metal boride in powder form and have, therefore, the following drawbacks:

(1) The commercially available powders of borides of Group IVa to VIa elements generally have a large particle diameter and even contain coarse particles having a diameter exceeding 10 microns. The coarse particles are likely to form an origin of fracture and lower the strength of a SiC-based material;

(2) Fine powders of borides of Group IVa to VIa elements are generally so reactive with water that water cannot be used for mixing them with other materials. When the mixture is dried, it is desirable to employ an inert atmosphere. If a slurry prepared by mixing SiC, a fine boride powder and a sintering additive with water is dried in the air to form a powder, the surfaces of the boride particles are oxidized. Therefore, the sintered product shows lower strength at an elevated temperature and poor improvement in fracture toughness. Moreover, the use of these oxidized powders sometimes makes it difficult to obtain a dense sintered product, as a result of swelling or other defects. These problems may be overcome if an organic solvent is used for mixing the materials to form a slurry, and if it is dried in a nonoxidizing atmosphere. This method is, however, likely to present a problem of safety or sanitation and is, moreover, costly, as it requires a spray drier of the explosion-proof type or a vacuum drier. If no liquid is used for mixing the materials, it is difficult to obtain a uniform mixture and the agglomeration of boride particles is likely to result in a product of low strength; and (3) The powders of borides of Group IVa to VIa elements contain impurities, such as free carbon and oxygen, and the use thereof gives rise to a wide variation of properties of a sintered body, such as high temperature strength and fracture toughness.

SUMMARY OF THE INVENTION

Under these circumstances, it is an object of this invention to provide a method which can manufacture a silicon carbide-based material containing a boride of any of Group IVa to VIa elements without using any such boride, which is inferior in properties and is difficult to handle, as a starting material.

It is another object of this invention to provide a composition of raw materials which can advantageously be used when the method of this invention is carried out.

The silicon carbide-based material of this invention in which at least one of the borides of Group IVa to VIa elements is dispersed is characterized by firing a a composition of raw materials comprising silicon carbide, a substance containing at least one of Group IVa to VIa elements except the borides thereof, and a substance containing boron except the borides of Group IVa to VIa elements, and further containing, if required, at least one of carbon and an organic compound which can produce carbon as a result of thermal decomposition.

The composition of this invention is characterized by comprising silicon carbide, a substance containing at least one of Group IVa to VIa elements except the borides thereof, and a substance containing boron except the borides of Group IVa to VIa elements, and further containing, if required, at least one of carbon and an organic compound which can produce carbon as a result of thermal decomposition.

According to this invention, it is possible to manufacture a silicon carbide-based material in which at least one of the borides of Group IVa to VIa elements is dispersed, without using any such boride as a starting material. Since no such boride is used as a starting material, water can be used for preparing a mixture of starting materials and a slurry thereof can be dried in an atmosphere other than an inert one, too.

The silicon carbide-based material manufactured in accordance with this invention has a high strength, as the boride particles which it contains have a small diameter. The uniform distribution of fine boride particles prevents any reduction of the fracture toughness.

Moreover, substantial inclusion of impurities rarely occurs, since no such boride is used as a starting material. This is another factor that makes it possible to manufacture a silicon carbide-based material which is reliable in high temperature strength, fracture toughness, and other properties.

These and other objects, features and advantages of this invention will become more apparent from the following description and the accompanying drawings.

DETAILED DESCRIPTION OF THE INVENTION

Figure 1:
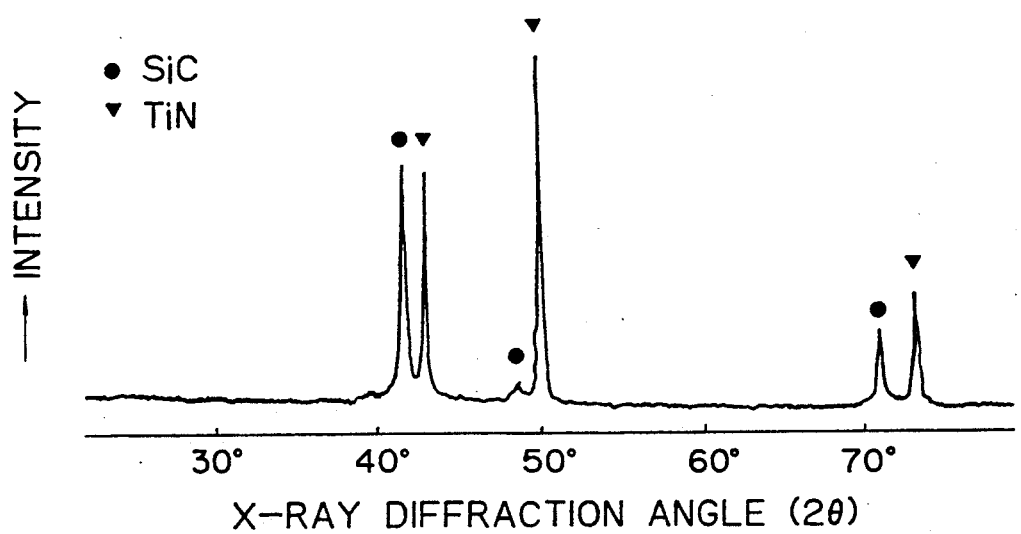
FIG. 1 is a chart showing the X-ray diffraction pattern of a mixed powder of SiC, TiN and B in EXAMPLE 1.

The composition of raw materials according to this invention is a mixture of SiC, a substance containing at least one of Group IVa elements (Ti, Zr and Hf), Group Va elements (V, Nb and Ta) and Group VIa elements (Cr, Mo and W) (hereinafter referred to as the metal element-containing substance) excluding any boride thereof, and a substance containing boron (hereinafter referred to as the boron-containing substance) excluding any boride of any of Group IVa to VIa elements (hereinafter referred to as the metal element boride). If required, it may further contain carbon, or an organic compound which can produce carbon as a result of thermal decomposition, or both. The composition is preferably used in powder form for manufacturing a SiC-based material.

The silicon carbide may be either of the $\alpha$-type or of the $\beta$-type. It is preferably in the form of a powder having an average particle diameter not exceeding one micron to ensure the manufacture of a SiC-based material of high density.

The metal element-containing substance may be selected from among, for example, oxides such as TiO, $TiO_2$, $Ti_2O_3$, ZrO, $ZrO_2$, $HfO_2$, VO, $VO_2$, $V_2O_3$, $V_2O_5$, NbO, $NbO_2$, $Nb_2O_5$, $Ta_2O_5$, $Cr_2O_3$, $MoO_2$, $MoO_3$, $WO_2$ and $WO_3$, carbides such as TiC, ZrC, HfC, VC, NbC, $Nb_2C$, TaC, $Ta_2C$, $Cr_3C_2$, $Cr_7C_3$, $Cr_{23}C_6$, $Mo_2C$, MoC, W C and WC, nitrides such as TiN, ZrN, HfN, VN, NbN, TaN, $Cr_2N$, $Mo_2N$, MoN, $W_2N$ and WN, solid solutions formed by those substances, such as Ti(C,N) and (Ta,Zr)C, compounds formed by those substances, such as $TiZrO_4$ and $ZrW_2O_8$, compounds or solid solutions formed by those substances and silicon compounds, such as $ZrSiO_4$ (zircon), compounds or solid solutions formed by those substances and aluminum compounds, such as $Al_2TiO_5$, and salts, alkoxides or organic substances which produce those substances as a result of thermal decomposition. At least one of the substances as hereinabove listed by way of example is employed. The metal element-containing substance may be particulate, fibrous, or liquid. The use of a fibrous substance may sometimes result in the formation of a fibrous metal element boride. The use of an oxide, or a substance which produces an oxide as a result of thermal decomposition, is preferable to form a metal boride having a small particle diameter which is uniformly dispersed in a SiC-based material to improve its strength and toughness. The use of an oxide is also preferable, as it can be easily obtained as a fine powder of high purity.

The boron-containing substance may be selected from among boron (B), boron carbide ($B_4C$), boron nitride (BN), boron oxide ($B_2O_3$), carboranes ($B_xC_yH_z$), and other inorganic or organic substances. At least one of them is employed. The most preferable substance is $B_4C$, as it does not easily react with water, but easily forms a metal element boride.

The metal element-containing substance and the boron-containing substance form a metal element boride if they are each in the form of a powder having an average particle diameter not exceeding 10 microns. However, the finer the powders, the more easily or effectively they react with each other. Therefore, it is preferable that each powder have an average particle diameter not exceeding two microns.

When the mixture of raw materials is fired to manufacture a SiC-based material, the metal element-containing substance and the boron-containing substance react with each other to form a metal element boride which is dispersed in the SiC-based material. Each metal element can form a number of borides having different stoichiometric ratios. For example, it is known that niobium (Nb) can form five kinds of borides, i.e. $Nb_2B$, $Nb_3B_2$, NbB, $Nb_3B_4$ and $NbB_2$ Niobium diboride ($NbB_2$) has a lower specific gravity, a higher thermal conductivity and a lower coefficient of thermal expansion than any other niobium boride. It can form a composite material with SiC which is superior in specific strength and thermal shock resistance to any composite material that can be formed by any other niobium boride with SiC. This is the case with any other metal element and the diboride (hereinafter expressed as $MB_2$) is preferable to any other form of boride. However, $Mo_2B_5$ and $W_2B_5$ are both known as showing good properties. A metal diboride, $MB_2$, is formed if the amounts of the substances which are employed for that purpose are in a molar ratio, M:B, of 1:2.

The boron-containing substance functions as a sintering additive, too, and that portion of the substance which does not participate in the formation of the metal element boride can be used as such. Therefore, if the boron-containing substance is used as the sintering additive, too, it is employed in an amount which is greater than that which is required to form the metal element boride. The excess amount is preferably from 0.2 to 8 parts by weight in terms of boron for 100 parts by weight of SiC. Any amount less than 0.2 part by weight would render sintering difficult and any amount exceeding 8 parts by weight would only be unnecessary.

If an oxide ($MO_x$) is used as the metal element-containing substance, carbon is required by the reaction which forms the metal element boride during the stage of firing. For example, when boron is used as the boron-containing substance to form $MB_2$, carbon is required for reducing $MO_x$, as shown by formula (1):

$$MO_x + 2B + xC \rightarrow MB_2 + xCO \uparrow \qquad (1)$$

The formation of $MB_2$ in this case requires that M, B and C have a molar ratio of 1:2:x. If $MO_x$ is, for example, $Nb_2O_5$, the formation of $MB_2$ requires that Nb, B and C have a molar ratio of 1:2:2.5. If $B_4C$ is used as the boron-containing substance, it can be used as a source of carbon, too. Therefore, it follows that when 1 mol of $Nb_2O_5$ is used as the metal element-containing substance, the amount of carbon required is 5 mols if boron or BN is used as the boron-containing substance, but is 4 mols if $B_4C$ is used.

The formation of $M_2B_5$ requires that M, B and C have a molar ratio of 2:5:2x, as shown by formula (2):

$$2MO_x + 5B + 2xC \rightarrow M_2B_5 + 2xCO \uparrow \qquad (2)$$

If a silicate compound, such as $ZrSiO_4$ (double oxides formed by reacting $SiC_2$), or double oxides of metal elements, such as $Al_2TiO_5$ (double oxides formed by reacting $Al_2O_3$) are used as the metal element-containing substance, additional carbon is required for reducing and carbonizing said double oxides to form SiC. If precursors of oxides, such as chlorides changed into the metal element-containing substance by heating are used, additional carbon is also required for reducing and carbonizing said precursors.

If the mixture of raw materials is fired by any method other than sintering under pressure, it is necessary to use carbon as a sintering additive in addition to the boron-containing substance. If the metal element-containing substance or the boron-containing substance is a carbide, the carbon which is produced as a result of the formation of the metal boride can be used as the sintering additive.

If the carbide does not supply a sufficient amount of carbon as the sintering additive, or if neither of the metal element-containing and boron-containing substances is a carbide, it is necessary to add carbon, or an organic compound which produces carbon as a result of thermal decomposition, or both. When the metal element-containing substance is an oxide, a large amount of carbon or an organic compound which produces carbon as a result of thermal decomposition must be added, in order to supply not only the carbon which is required for reducing the oxide, but also the carbon which is used as the sintering additive.

The amount of the carbon which is used as the sintering additive should not exceed 5 parts by weight for 100 parts by weight of SiC. The addition of any amount exceeding 5 parts by weight would make it difficult to obtain a sintered product of high density. The amount should be in the range of 0.5 to 5 parts by weight if neither of the metal element-containing nor boron-containing elements is a carbide. Any deviation from this range would make it difficult to obtain a sintered product of high density.

No carbon is required as the sintering additive if the mixture of raw materials is fired by sintering under pressure.

The metal element-containing substance and the boron-containing substance should be employed in a ratio enabling their reaction to form a metal element boride in such an amount that the SiC and the boride in the final SiC-based material may have a ratio by volume of 95:5 to 50:50. Any material having a smaller boride ratio would hardly show any improved toughness, and any material having a larger oride ratio would have only low oxidation resistance at an elevated temperature.

Therefore, the manufacture of the SiC-based material in which the metal boride, $MB_2$, is dispersed preferably employs for 100 parts by weight of SiC 1.64 $d_B \cdot M_m/M_B$ to 31.2 $d_B \cdot M_m/M_B$ parts by weight of the metal element-containing substance in terms of the metal element and 0.2 + 35.4 $d_B/M_B$ to 8 + 673 $d_B/M_B$ parts by weight of the boron-containing substance in terms of boron, in which $M_m$ stands for the atomic weight of the metal element, $M_B$ stands for the molecular weight of $MB_2$ and $d_B$ stands for the density of $MB_2$. If an oxide is used as the metal element-containing substance, it is necessary to supply that amount of carbon which covers both what is required for reducing the oxide, and what is required as the sintering additive. If no oxide is used, however, it is sufficient to supply only carbon as the sintering additive by adding carbon or a substance which produces carbon as a result of thermal decomposition.

It is possible to use a metal element itself as the metal element-containing substance. A fine metal powder is, however, expensive. Moreover, it is highly reactive and is likely to cause an explosive reaction.

The organic compound which produces carbon as a result of thermal decomposition is selected from among, for example, phenolic resins, coal tar pitch and furan resins. At least one of them may be used.

When both oxide ($MO_x$) and carbide ($MC_y$) are used as the metal element-containing substances, and $B_4C$ as the boron-containing substance, to form $M_B$, their reaction can be expressed by the following formula:

$$lMC_y + mMO_x + \left(\frac{l+m}{2}\right) B_4C \rightarrow (l+m)MB_2 + mxCO \uparrow$$

in which l, m and $$\frac{l+m}{2}$$

define the molar mixing ratio of $MC_y$, $MO_x$ and $B_4C$. In this case, no carbon need to be added for reducing the oxide, but it is sufficient to add only carbon as the sintering additive. This reaction enables a smaller degree of shrinkage in a sintered product than the reaction in which only an oxide is used as the metal containing substance. If, for example, $TiO_2$ is selected as $MO_x$, and TiC as $MC_y$, and if $TiO_2$, TiC and $B_4C$ are mixed in a molar ratio of 1:1:1, the following reaction takes place:

$$TiO_2 + TiC + B_4C \rightarrow 2TiB_2 + 2CO \uparrow$$

If $Ta_2O_5$ is selected as $MO_x$, and TaC as $MC_y$, and TaC, $Ta_2O_5$ and $B_4C$ are mixed in a molar ratio of 8:3:7, the following reaction takes place:

$$8TaC + 3Ta_2O_5 + 7B_4C \rightarrow 14TaB_2 + 15CO \uparrow$$

The composition of raw materials according to this invention may be prepared by mixing SiC, the metal element-containing substance and the boron-containing substance, and by further adding, if required, carbon, or an organic compound which produces carbon as a result of thermal decomposition, or both.

A wet method is preferable to prepare a uniform mixture of the raw materials, though a dry mixing method may also be employed. Water or an organic solvent can be used as a mixing medium for preparing a wet mixture. Spray drying, freeze drying, filtration by suction, or any other appropriate method can be employed for drying the mixture. The drying of the mixture can be carried out in a vacuum, or in an inert, oxidizing or reducing atmosphere. However, it is sometimes essential to employ an organic solvent as the mixing medium if the raw materials include an organic substance. The use of an organic solvent is also preferable if the raw materials include a fine powder of metallic boron. In any other case, it is possible to use water for mixing the raw materials and dry the mixture in the air and it is, therefore, possible to prepare a large amount of powder by using an ordinary spray drier which is not of the explosion-proof type.

An organic solvent is used for preparing a wet mixture if the raw materials include an organic compound which produces carbon as a result of thermal decomposition. If a carbon powder is included, it is possible to improve the dispersion of the carbon powder by adding a small amount of a surface active agent when preparing a wet mixture.

The composition of the raw materials according to this invention may further contain a sintering additive, such as Al, AlN or $Al_4C_3$.

The composition of the raw materials is preferably molded before it is fired, when it is used for manufacturing a molded product of a SiC-based material. In this connection, it is possible to employ any of the methods which are usually employed for molding ceramics. Examples of these methods include slip casting, injection molding, extrusion, die pressing, isostatic pressing, dough pressing and a method employing a doctor blade.

The composition of the raw materials is preferably fired in a vacuum or a nonoxidizing atmosphere in order to yield a SiC-based material without being oxidized. The firing temperature preferably ranges from 1900° C. to 2300° C. for pressureless sintering, and from 1800° C. to 2300° C. for hot pressing. These ranges of temperatures enable the manufacture of a sintered product having a theoretical density of at least 90%. However, if the boride which is going to be formed is of chromium or molybdenum, it is preferable to employ a firing temperature not exceeding 2100° C., as the boride of chromium or molybdenum has a melting point which is as low as about 2200° C. If any method other than sintering under pressure is employed, it is preferably to heat the composition in a vacuum until the temperature reaches a level selected from the range of 1100° C. to 1800° C., so that the reaction which removes $SiO_2$ from the surface of SiC by reduction may be promoted.

When the composition is fired, a metal element boride is formed by the reaction of the metal element-containing substance and the boron-containing substance and is dispersed in SiC. If the metal element-containing and boron-containing substances have an average particle diameter of about 1.5 microns, the boride has an average particle diameter of 1 to 3 microns and improves a toughness of a SiC-based material.

In any case where the boride-forming reaction rate is relatively slow, as when an oxide is used as the metal element-containing substance, the composition is held at a temperature above the level at which the reaction starts, and preferably below the level at which the densification of SiC proceeds to a large extend, i.e. at a temperature not exceeding 1800° C., for a sufficiently long time to complete the reaction before the temperature is further raised. In the event that any gas, such as CO or $N_2$, occurs with the reaction, the reaction can be promoted if evacuation is continued for removing the gas throughout the period during which the composition is held at the lower temperature.

When, for example, SiC, $TiO_2$, $B_4C$ and C are used for manufacturing a SiC-based material in which $TiB_2$ should occupy 30% by volume of the final product, it is preferably to hold the mixture at a temperature of 1400° C. to 1500° C. for at least two hours in a vacuum, when it is fired. If it is thereafter heated to a temperature of 1900° C. to 2300° C. in a non-oxidizing atmosphere, such as argon gas, to complete its firing, it is possible to obtain a sintered product of SiC and $TiB_2$ with high density. If, on the other hand, the mixture is held at 1500° C. for only an hour, it is only possible to obtain a sintered product having a relative density which is as low as 60 to 70%. The conditions under which the mixture is held before it is heated to the final firing temperature depend on a number of factors such as the kinds of the materials as to be reacted, the amount of the gas resulting from the reaction and the construction of the furnace employed, particularly whether it is so constructed as to facilitate the removal of the gas.

If the substances to be reacted are of such combination that their reaction does not form any carbon, it is essential to add at least one of carbon and an organic compound which produces carbon as a result of thermal decomposition, when any method other than hot pressing is employed for firing the mixture. The carbon which is added, or the carbon resulting from the thermal decomposition of the organic compound, and the excess of boron or BN function as the sintering additives. Even if a metal carbide or/and B$_4$C is employed, it is necessary to add at least one of carbon and an organic compound which produced carbon as a result of thermal decomposition, when the carbide or B$_4$C employed has only a small quantity.

Hot isostatic pressing (HIP) can be employed for sintering the mixture. According to one form of method known as the post-HIP, a sintered body which has been densified by pressureless sintering or hot pressing until all or almost all of its open porosty disappears is isostatically pressed at a temperature of 1700° C. to 2200° C. in a nonoxidizing atmosphere to yield a product of high density and strength. An isostatic pressure of at least 50 MPa is preferably applied, though a lower pressure is also effective if it is not lower than 10 MPa. According to another method known as the direct-HIP, a molded body is sealed up with glass or other materials and isostatically pressed at an elevated temperature. If the composition employed generates gas by the reaction which forms a metal boride, the molded body must be fired and the reaction completed before it is sealed up. There are several ways of sealing a molded body. According to the glass capsule method, the molded body is sealed in a vacuum glass capsule. According to the glass bath method, the molded body is embedded in a glass method, a glass powder is applied to the surface of the molded body and is sintered by heating to form a gastight sealing layer on the molded body before it is subjected to HIP treatment. According to the press sealing method, the molded body is heated and uniaxially pressed in a glass powder, so that a gastight sealing layer of glass may be formed on the molded body before it is subjected to HIP treatment. In any event, the HIP treatment is carried out under the same conditions as those of the post-HIP to produce a SiC-based composite material of high density.

Thus, the metal boride particles are formed by the reaction of the metal element-containing substance and the boron-containing substance during the first stage of firing, and the SiC matrix is densified by the action of the sintering additive. The sintered product may contain precipitated or residual carbon, or residual boron carbide. The presence of any such carbon or carbide does, however, not have any adverse effect on the properties of the product, if it is in a small quantity.

The metal boride particles cause the deflection and branching of any crack that may grow in the SiC-based material manufactured in accordance with this invention. The deflection and branching of the cracks consume a large amount of fracture energy and thereby enable the SiC-based material to achieve a high level of fracture toughness. Moreover, the metal boride particles are so fine that they hardly form any origin of fracture and lower the strength of the SiC-based material.

The invention will now be described more specifically with reference to a variety of examples.

EXAMPLE 1

A powder of TiN having an average particle diameter of 1.5 microns and a powder of boron (B) having an average particle diameter of 1.0 micron were mixed with 100 parts by weight of a powder of $\beta$-SiC having an average particle diameter of 0.7 micron in a ball mill by employing ethanol as a mixing medium. The amounts of the TiN and boron powders which were employed are shown in Table 1 below. The amount of boron is shown as the total of the amount of boron which was required to form TiB$_2$ by reacting with TiN, and three parts by weight of boron as a sintering additive. The slurry which had been obtained by mixing the powders was subjected to filtration by suction and dried. The resulting powder was ground and screened, and a molded body was prepared therefrom by die pressing at a pressure of 300 kg/cm$^2$. The molded body was placed in a graphite die and was hot pressed at a temperature of 2150° C. and a pressure of 20 MPa for 30 minutes. The hot pressing was carried out by heating the molded body in a vacuum until its temperature was raised to 1000° C., and introducing argon gas into a hot pressing furnace when the temperature of 1000° C. was reached, and was thereafter continued in an argon gas atmosphere having a pressure of 1 atm. Five samples were prepared.

For the sake of comparison, a sample in which no TiB$_2$ had ben formed was prepared, as shown in Table 1.

The samples were examined for relative density, 4-point bending strength and K$_{IC}$. The results are shown in Table 1. All of the samples had a relative density which was higher than 98%. The bending strength was tested by the method as specified by JIS (Japanese Industrial Standard). All of Samples Nos. 1 to 5 of this invention showed a strength which was higher than that of Comparative Sample No. C$_1$ and which no TiB$_2$ had been formed, as no TiN had been added. Their strength did not drop even in a vacuum at a temperature of 1400° C., but showed an increase of 20 to 50%. The K$_{IC}$ values of Samples Nos. 1 to 5 as determined by the IM (indentation microfracture) method ranged from 3.5 MPa·m$^{\frac{1}{2}}$ to 6.3 MPa·m$^{\frac{1}{2}}$ and was 30 to 130% higher than that of Comparative Sample No. C1.

Samples Nos. 3 to 5 showed an electrical resistivity not exceeding 0.1 ohm-cm and were easy of electro-discharge machining for wire cutting and die sinking.

Figure 2:
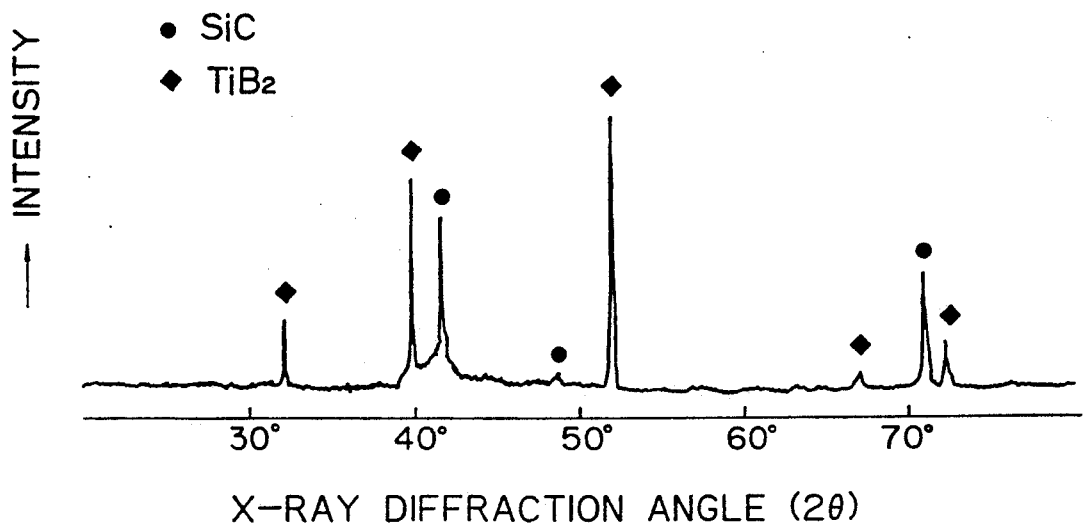
FIG. 2 is a chart showing the X-ray diffraction pattern of a sample obtained by hot pressing the mixed powder in EXAMPLE 1.

FIG. 1 is a chart showing the X-ray diffraction pattern of the mixed powder according to Sample No. 4 and FIG. 2 is a chart showing the X-ray diffraction pattern of the hot pressed product thereof. As is obvious therefrom, TiB$_2$ was formed by the reaction of TiN and boron. No diffraction peak of boron appeared, as it was amorphous.

TABLE 1

| | Sample No. | Sic:TiB$_2$ (vol. ratio) | TiN (parts by weight) | B (parts by weight) | TiB$_2$ (parts by weight) | Relative density (%) | 4-point bending strength (MPa) In the air, room temp. | 4-point bending strength (MPa) In vacuum, 1400° C. | K$_{Ic}$ (MPa · m$^{\frac{1}{2}}$) |
|---|---|---|---|---|---|---|---|---|---|
| Comparative Example | C1 | 100:0 | 0 | 3.0 | 0 | 100 | 350 | 440 | 2.7 |
| Example | 1 | 95:5 | 6.6 | 5.3 | 0 | 99.8 | 500 | 610 | 3.5 |
| | 2 | 90:10 | 13.9 | 7.9 | 0 | 99.5 | 560 | 670 | 4.1 |
| | 3 | 80:20 | 31.3 | 13.9 | 0 | 99.9 | 490 | 750 | 5.0 |
| | 4 | 70:30 | 53.7 | 21.8 | 0 | 99.2 | 480 | 600 | 5.6 |

TABLE 1-continued

| Sample No. | SiC:TiB$_2$ (vol. ratio) | TiN (parts by weight) | B (parts by weight) | TiB$_2$ (parts by weight) | Relative density (%) | 4-point bending strength (MPa) | | K$_{1c}$ (MPa · m$^{\frac{1}{2}}$) |
|---|---|---|---|---|---|---|---|---|
| | | | | | | In the air, room temp. | In vacuum, 1400° C. | |
| 5 | 50:50 | 125.4 | 46.8 | 0 | 98.1 | 420 | 510 | 6.3 |

EXAMPLE 2

Three samples of mixed powders were prepared by repeating EXAMPLE 1 substantially, but employing, instead of the combination of TiN and boron, a powder of TiC having an average particle diameter of 1.5 microns and a powder of boron having an average particle diameter of 1.0 micron, a powder of TiN having an average particle diameter of 1.5 microns and a powder of B$_4$C having also an average particle diameter of 1.5 microns, and a powder of TiC having an average particle diameter of 1.5 microns and a powder of BN having an average particle diameter of 1.0 micron. The amounts of the titanium- and boron-containing substances employed for each sample are shown in TABLE 2 and were equal, in terms of titanium and boron, respectively, to those employed for Sample No. 4 in EXAMPLE 1. The methods of EXAMPLE 1 were all repeated for mixing, drying, molding and hot pressing, except for the mixture containing TiC and BN, as well as for determining the density, strength and K$_{IC}$ value of each sample. The mixture containing TiC and BN (Sample No. 8) was heated in a vacuum to a temperature of 1800° C. and held at that temperature for four hours. Then, argon gas was introduced into the furnace and the mixture was subjected to 30 minutes of hot pressing at 2150° C. in an argon gas atmosphere having a pressure of 1 atm.

All of the three hot pressed products had a theoretical density higher than 90%. They showed a four-point bending strength exceeding 350 MPa at an ordinary room temperature and maintained it even at a temperature of 1400° C. Moreover, they had a K$_{IC}$ value which was at least twice as high as that of the SiC material in which no TiB$_2$ had been formed.

EXAMPLE 3

A powder of rutile type TiO$_2$ having an average particle diameter of 0.4 micron, a powder of B$_4$C having an average particle diameter of 1.5 microns and a powder of carbon black having an average particle diameter of 0.02 micron, of which the amounts are shown in TABLE 3, were mixed with 100 parts by weight of a powder of α-SiC having an average particle diameter of 0.7 micron in a ball mill using water as a mixing medium. The amount of B$_4$C which was employed was equal to that which was required to form TiB$_2$ by reacting with TiO$_2$, plus two parts by weight in terms of boron. The slurry which had been prepared by mixing the powders was subjected to filtration by suction and dried. The dry mixture was crushed and subjected to die pressing at a pressure of 300 kg/cm$^2$. The molded product was placed in a graphite die and subjected to 30 minutes of hot pressing at a temperature of 2150° C. and a pressure of 25 MPa. The hot pressing was carried out by heating the molded product to 1500° C., while evacuating the furnace, holding it at that temperature in a vacuum for four hours, and thereafter raising the temperature, while introducing argon gas into the furnace, to continue the hot pressing in an argon gas atmosphere having a pressure of 1 atm.

A sample of a hot pressed product of SiC in which no TiO$_2$ had been added, and no TiB$_2$ had, therefore, been formed, and a sample in which a powder of TiB$_2$ having an average particle diameter of 4.0 microns had been added were also prepared for comparative purposes.

Each sample was examined for properties. The results are shown in TABLE 3. All of Samples Nos. 9 to 12 according to this invention had a density exceeding a theoretical density of 98%. They showed a strength which was higher than that of the comparative samples. Their strength did not drop even in a vacuum at a temperature of 1400° C., but showed an increase of 19 to 23%. Moreover, they showed a K$_{IC}$ value which was 30 to 130% higher than that of the comparative samples.

Samples Nos. 10 to 12 permitted cutting by electro-discharge machining.

TABLE 2

| Sample No. | Titanium-containing substance | | Boron-containing substance | | Relative density (%) | 4-point bending strength (MPa) | | K$_{1c}$ (MPa · m$^{\frac{1}{2}}$) |
|---|---|---|---|---|---|---|---|---|
| | Name | Amount (parts by weight) | Name | Amount (parts by weight) | | In the air, room temp. | In vacuum, 1400° C. | |
| 6 | TiC | 52.0 | B | 21.8 | 98.0 | 450 | 520 | 5.5 |
| 7 | TiN | 53.7 | B$_4$C | 27.8 | 96.6 | 460 | 550 | 5.6 |
| 8 | TiC | 52.0 | BN | 50.0 | 90.5 | 360 | 400 | 5.4 |

TABLE 3

| | Sample No. | SiC:TiB$_2$ (Vol. ratio) | TiO$_2$ (parts by weight) | TiB$_2$ (parts by weight) | B$_4$C (parts by weight) | C (parts by weight) | Relative density (%) | 4-point bending strength (MPa) | | K$_{1c}$ (MPa · m$^{\frac{1}{2}}$) |
|---|---|---|---|---|---|---|---|---|---|---|
| | | | | | | | | In the air, room temp. | In vacuum 1400° C. | |
| Comparative Example | C2 | 100:0 | 0 | 0 | 2.6 | 0 | 100 | 350 | 440 | 2.7 |
| Example | 9 | 95:5 | 8.5 | 0 | 5.5 | 1.9 | 99.9 | 510 | 620 | 3.5 |
| | 10 | 85:15 | 28.6 | 0 | 12.4 | 6.4 | 99.6 | 530 | 650 | 4.6 |
| | 11 | 70:30 | 69.4 | 0 | 26.5 | 15.6 | 99.4 | 500 | 610 | 5.7 |
| | 12 | 50:50 | 161.9 | 0 | 58.5 | 36.5 | 98.2 | 430 | 510 | 6.3 |
| Comparative | C3 | 70:30 | 0 | 60.3 | 2.6 | 0 | 98.7 | 400 | 370 | 4.4 |

TABLE 3-continued

| Sample No. | SiC:TiB$_2$ (Vol. ratio) | TiO$_2$ (parts by weight) | TiB$_2$ (parts by weight) | B$_4$C (parts by weight) | C (parts by weight) | Relative density (%) | 4-point bending strength (MPa) In the air, room temp. | 4-point bending strength (MPa) In vacuum 1400° C. | K$_{1c}$ (MPa · m$^{\frac{1}{2}}$) |
| --- | --- | --- | --- | --- | --- | --- | --- | --- | --- |
| Example | | | | | | | | | |

EXAMPLE 4

A powder of TiN having an average particle diameter of 1.5 microns and a powder of B$_4$C also having an average particle diameter of 1.5 microns, of which the amounts are shown in TABLE 4 below, were mixed with 100 parts by weight of a powder of β-SiC having an average particle diameter of 0.4 micron in a ball mill using water as a mixing medium to prepare a slurry. Each amount of B$_4$C that was employed was equal to that which was required to form TiB$_2$ by reacting with TiN, plus one part by weight in terms of boron. The slurry was dried by a spray drier. The dry mixture was subjected to die pressing at a pressure of 300 kg/cm$^2$ and isostatic pressing at a pressure of 3000 kg/cm$^2$. The molded product was placed in a graphite vessel and subjected to four hours of pressureless sintering at a temperature of 2150° C. The sintering was carried out by heating to a temperature of 1600° C. in a vacuum and then introducing argon gas into a carbon-resistance furnace, and was continued in an argon gas atmosphere having a pressure of 1 atm.

A comparative sample was prepared by sintering a mixture which had been obtained by mixing 100 parts by weight of SiC, 1.3 parts by weight of B$_4$C and two parts by weight of a powder of carbon having an average particle diameter of 0.02 micron, but not adding TiN.

Each sample was examine for relative density, four-point bending strength (according to JIS) and K$_{IC}$. The results are shown in TABLE 4. All of the sintered products had a density which was higher than a theoretical density of 92%. All of Samples Nos. 13 to 17 according to this invention showed a strength which was higher than that of Comparative Sample No. C4. Their strength did not drop even at a temperature of 1400° C. in a vacuum, but showed an increase of 8 to 15%. their K$_{IC}$ values as determined by the IM method were 30 to 130% higher than that of the comparative sample. When one part by weight of carbon black was added to the powder mixture having a theoretical TiB$_2$ amount of 5% by volume, its relative density increased to 98.0%.

Samples Nos. 15 to 17 had an electrical resistivity not exceeding 0.1 ohm-cm and were easy of electro-discharge machining for wire cutting and die sinking.

Figure 3:
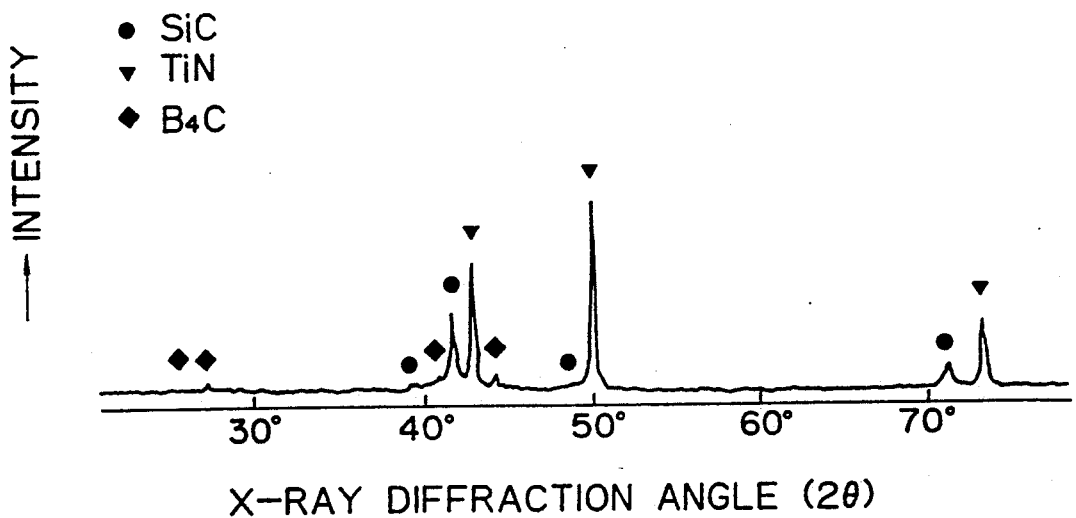
FIG. 3 is a chart showing the X-ray diffraction pattern of a mixed powder of SiC, TiN and $B_4C$ in EXAMPLE 4.
Figure 4:
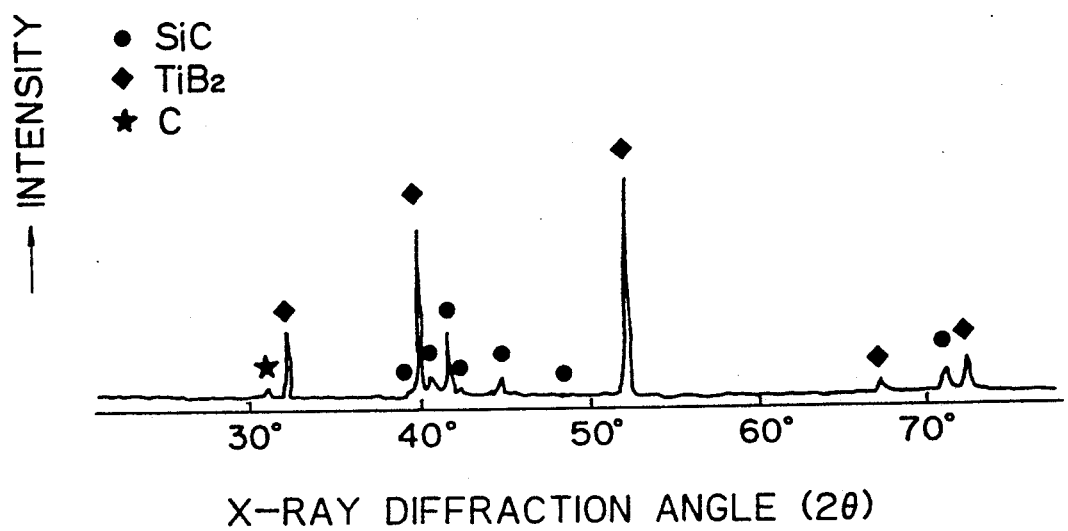
FIG. 4 is a chart showing the X-ray diffraction pattern of a sample obtained by the pressureless sintering of the mixed powder in EXAMPLE 4.

FIG. 3 is a chart showing the X-ray diffraction pattern of Sample No. 17 and FIG. 4 is a chart showing the X-ray diffraction pattern of the sintered product thereof. As is obvious therefrom, the reaction of TiN and B$_4$C formed TiB$_2$ and also carbon (graphite).

TABLE 4

| | Sample No. | SiC:TiB$_2$ (vol. ratio) | TiN (parts by weight) | B$_4$C (parts by weight) | C (parts by weight) | Relative density (%) | 4-point bending strength (MPa) In the air, room temp. | 4-point bending strength (MPa) In vacuum, 1400° C. | K$_{1c}$ (MPa · m$^{\frac{1}{2}}$) |
| --- | --- | --- | --- | --- | --- | --- | --- | --- | --- |
| Comparative Example | C4 | 100:0 | 0 | 1.3 | 2 | 98.0 | 450 | 500 | 2.8 |
| Example | 13 | 95:5 | 6.6 | 4.2 | 0 | 92.4 | 460 | 520 | 3.6 |
| | 14 | 90:10 | 13.9 | 7.5 | 0 | 97.2 | 580 | 640 | 4.3 |
| | 15 | 80:20 | 31.3 | 15.2 | 0 | 97.8 | 550 | 630 | 5.1 |
| | 16 | 70:30 | 53.7 | 25.3 | 0 | 98.0 | 520 | 600 | 5.6 |
| | 17 | 50:50 | 125.4 | 57.2 | 0 | 97.6 | 510 | 550 | 6.5 |

EXAMPLE 5

Two samples of mixed powders each having a design SiC to TiB$_2$ ratio by volume of 80:20 were prepared by employing as the combination of the titanium- and boron-containing substances a powder of TiC having an average particle diameter of 1.5 microns and a powder of BN having an average particle diameter of three microns, and a powder of TiC$_{0.5}$N$_{0.5}$ having an average particle diameter of 1.5 microns and a powder of boron having an average particle diameter of 1.0 micron, of which the amounts are shown in TABLE 5 below. The amount of the boron-containing substance employed for each sample included one part by weight of boron which was intended to serve as a sintering additive.

The methods of EXAMPLE 4 were repeated for sintering the mixtures and examining the properties of the sintered products except that ethanol was employed as mixing media of Sample No. 19. However, the mixture containing TiC and BN was heated to 1800° C. in a vacuum and held at that temperature for four hours so that the precipitation of TiB$_2$ might be promoted, and argon gas was thereafter introduced into the furnace in which the mixture was sintered at 2200° C. for four hours in an argon gas atmosphere having a pressure of 1 atm.

The sintered products showed a relative density higher than 93%, a bending strength of at least 470 MPa at an ordinary room temperature, and a K$_{IC}$ value of at least 4.9 MPa·m$^{\frac{1}{2}}$.

TABLE 5

| | Sample No. | Titanium-containing substance Name | Titanium-containing substance Amount (parts by weight) | Boron-containing substance Name | Boron-containing substance Amount (parts by weight) | Relative density (%) | 4-point bending strength (MPa) In the air, room temp. | 4-point bending strength (MPa) In vacuum, 1400° C. | K$_{1c}$ (MPa · m$^{\frac{1}{2}}$) |
| --- | --- | --- | --- | --- | --- | --- | --- | --- | --- |
| Example | 18 | TiC | 30.3 | BN | 27.4 | 93.2 | 470 | 480 | 4.9 |
| | 19 | TiC$_{0.5}$ | 30.8 | B | 11.9 | 97.4 | 540 | 580 | 5.1 |

TABLE 5-continued

| Sample No. | Titanium-containing substance | | Boron-containing substance | | Relative density (%) | 4-point bending strength (MPa) | | $K_{1c}$ (MPa · m$^{\frac{1}{2}}$) |
|---|---|---|---|---|---|---|---|---|
| | Name | Amount (parts by weight) | Name | Amount (parts by weight) | | In the air, room temp. | In vacuum, 1400° C. | |
| | N$_{0.5}$ | | | | | | | |

For the sake of comparison, a mixed powder having a SiC to TiB$_2$ ratio by volume of 7:3 was prepared by mixing 100 parts by weight of SiC, 60.3 parts by weight of a powder of TiB$_2$, and one part by weight of boron and two parts by weight of carbon (a powder of carbon black having an average particle diameter of 1.0 micron), both as the sintering additives, by using water. The method of EXAMPLE 4 was repeated for the pressureless sintering of the powder. The sintered product showed a density which was equal to a theoretical density of 95.6%, but a four-point bending strength of only 370 MPa at an ordinary room temperature, or only 320 MPa at a temperature of 1400° C., and a $K_{IC}$ value of only 4.3 MPa·m$^{\frac{1}{2}}$.

EXAMPLE 6

A powder of anatase type TiO$_2$ having an average particle diameter of 0.4 micron, a powder of B$_4$C having an average particle diameter of 1.5 microns and a powder of carbon black having an average particle diameter of 0.02 micron, of which the amounts are shown in TABLE 6, were mixed with 100 parts by weight of a powder of β-SiC having an average particle diameter of 0.3 micron in a ball mill using water as a mixing medium to prepare a slurry. The amounts of B$_4$C and carbon which were employed for each sample were equal to the amounts giving a stoichiometric ratio as required for reducing TiO$_2$ to form a boride, plus one part by weight of B$_4$C in terms of boron and two parts by weight of carbon, respectively. The slurry was dried by a spray drier, and the dry mixture was subjected to die pressing at a pressure of 300 kg/cm$^2$ and isostatic pressing at a of 3000 kg/cm$^2$. The molded body was placed in a carbon-resistance furnace for firing at a temperature of 150° C. in an argon gas atmosphere having a pressure of 1 atm. The firing was carried out by heating the molded body to 1500° C., while evacuating the furnace, holding it at that temperature for four hours, and raising the temperature, while introducing argon gas into the furnace in which the molded body was sintered at a temperature of 2150° C. for four hours. The results are shown in TABLE 6.

For the sake of comparison, a sample in which no TiO$_2$ had been added, and a sample in which a powder of TiB$_2$ having an average particle diameter of four microns had been added, were likewise prepared, sintered and tested. The results are also shown in TABLE 6.

All of the sintered products had a density which was at least equal to 98% of a theoretical density. All of Samples Nos. 20 to 25 according to this invention showed a strength which was higher than that of the comparative sample in which no TiB$_2$ had been precipitated. Their strength did not drop even at a temperature of 1400° C. in a vacuum, but showed an increase of 12 to 17%. The samples of this invention also showed a $K_{IC}$ value which was 30 to 140% higher than that of the comparative sample in which no TiB$_2$ had been precipitated.

Samples Nos. 22 to 25 had an electrical resistivity not exceeding 0.1 ohm-cm and were easy of electro-discharge machining for wire cutting and die sinking.

Figure 5:
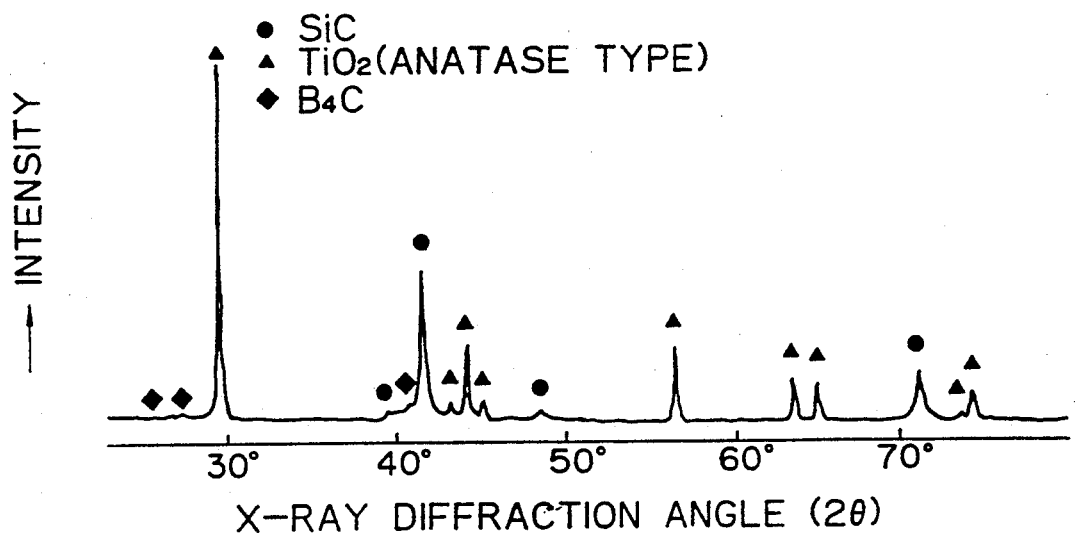
FIG. 5 is a chart showing the X-ray diffraction pattern of a mixed powder of SiC, $TiO_2$, $B_4C$ and C in EXAMPLE 6.
Figure 6:
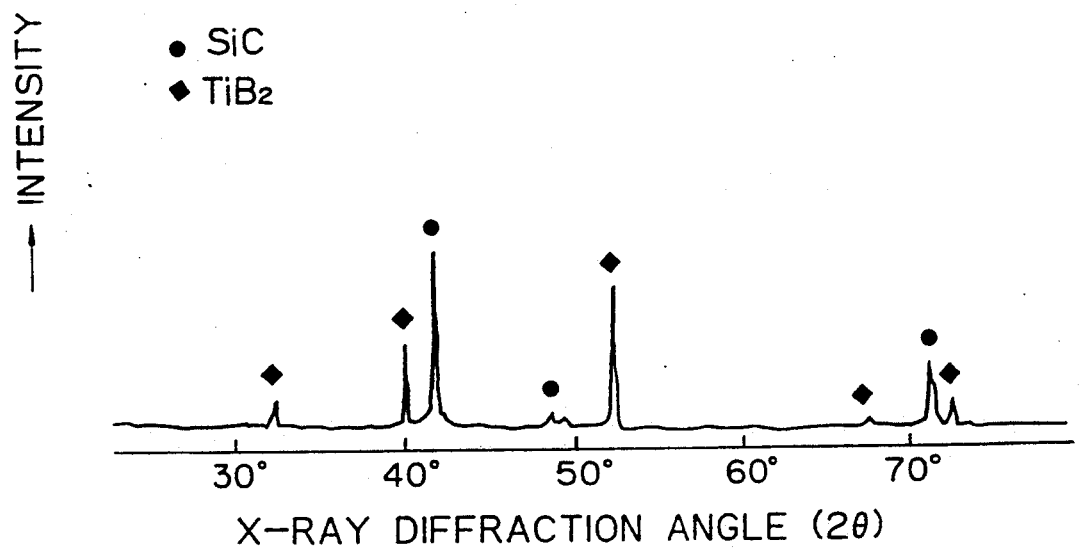
FIG. 6 is a chart showing the X-ray diffraction pattern of a sample obtained by the pressureless sintering of the mixed powder in EXAMPLE 6.

FIG. 5 is a chart showing the X-ray diffraction pattern of Sample No. 23 and FIG. 6 is a chart showing the X-ray diffraction pattern of the sintered product thereof. As is obvious therefrom, TiO$_2$ was reduced and borided to form TiB$_2$.

TABLE 6

| | Sample No. | SiC:TiB$_2$ (vol. ratio) | TiO$_2$ (parts by weight) | TiB$_2$ (parts by weight) | B$_4$C (parts by weight) | C (parts by weight) | Relative density (%) | 4-point bending strength (MPa) | | $K_{1c}$ (MPa · m$^{\frac{1}{2}}$) |
|---|---|---|---|---|---|---|---|---|---|---|
| | | | | | | | | In the air, room temp. | In vacuum 1400° C. | |
| Comparative Example | C5 | 100:0 | 0 | 0 | 1.3 | 2.0 | 98.0 | 450 | 500 | 2.8 |
| Example | 20 | 95:5 | 8.5 | 0 | 4.2 | 3.9 | 99.6 | 470 | 530 | 3.6 |
| | 21 | 90:10 | 18.0 | 0 | 7.5 | 6.1 | 99.5 | 600 | 680 | 4.2 |
| | 22 | 80:20 | 40.5 | 0 | 15.3 | 11.1 | 99.3 | 590 | 660 | 5.0 |
| | 23 | 70:30 | 69.4 | 0 | 25.2 | 17.6 | 99.0 | 580 | 660 | 5.7 |
| | 24 | 60:40 | 107.9 | 0 | 38.6 | 26.3 | 98.4 | 540 | 630 | 6.2 |
| | 25 | 50:50 | 161.9 | 0 | 57.2 | 38.5 | 98.1 | 520 | 600 | 6.7 |
| Comparative Example | C6 | 70:30 | 0 | 60.3 | 1.3 | 2.0 | 95.6 | 380 | 350 | 4.4 |

EXAMPLE 7

Six samples of mixed powders were prepared by repeating EXAMPLE 6 and employing 100 parts by weight of SiC, 69.4 parts by weight of TiO$_2$ and 17.6 parts by weight of carbon including two parts of excess carbon as the sintering additive, as well as a SiC to TiB$_2$ ratio by volume of 70:30 (Sample No. 23 in EXAMPLE 6), but varying the amount of B$_4$C as shown in TABLE 7 below. The methods of EXAMPLE 6 were repeated for making sintered products and testing them. The results are shown in TABLE 7.

As is obvious from TABLE 7, all of the sintered products of the mixtures containing 0.2 to 8 parts by weight of boron as the sintering additive showed a relative density exceeding 90%, a four-point bending strength of at least 350 MPa at an ordinary room temperature, and a $K_{IC}$ value of at least 4.3 MPa·m$^{\frac{1}{2}}$ (Samples Nos. 26 to 30), while Sample No. 31 containing 10 parts by weight of such boron showed a relative density of about 86%. On the other hand, Comparative Samples No. C7 in which no such excess of B$_4$C had been added showed a relative density of only about 70%.

TABLE 7

| | Sample No. | B$_4$C (parts by weight) | Excess B$_4$C (parts by weight of B) | Relative density (%) | 4-point bending strength (MPa) | | K$_{1c}$ (MPa · m$^{\frac{1}{2}}$) |
|---|---|---|---|---|---|---|---|
| | | | | | In the air, room temp. | In vacuum, 1400° C. | |
| Comparative Example | C7 | 24.0 | 0 | 70.6 | not measured | not measured | not measured |
| Example | 26 | 24.2 | 0.2 | 91.2 | 350 | 380 | 4.3 |
| | 27 | 25.2 | 1.0 | 99.0 | 580 | 660 | 5.7 |
| | 28 | 26.5 | 2.0 | 98.7 | 550 | 610 | 5.7 |
| | 29 | 30.4 | 5.0 | 96.4 | 490 | 550 | 5.4 |
| | 30 | 34.2 | 8.0 | 92.1 | 420 | 480 | 4.5 |
| | 31 | 36.7 | 10.0 | 86.2 | not measured | not measured | not measured |

EXAMPLE 8

Seven samples were prepared by employing a SiC to TiB$_2$ ratio by volume of 80:20 and mixing 100 parts by weight of SiC, 40.5 parts by weight of TiO$_2$ and 11.9 parts by weight of boron including one part by weight of excess boron with different amounts of carbon as shown in TABLE 8. The amounts of carbon included different amounts of excess carbon serving as the sintering additive, as shown in TABLE 8. The methods of EXAMPLE 6 were repeated for making sintered products and testing them. However, ethanol was employed as a mixing medium. The results are shown in TABLE 8.

As is obvious from TABLE 8, the sintered products which had been formed from the mixtures containing up to five parts by weight of excess carbon, inclusive, showed a relative density exceeding 90% (Samples Nos. 32 to 37), while the product of the mixture containing seven parts by weight of excess carbon had a relative density which was lower than 90% (Sample No. 38).

EXAMPLE 9

EXAMPLE 6 was repeated for molding and sintering Sample No 22 having a set SiC to TiB$_2$ratio by volume of 80:20 (TABLE 6), except that different sintering temperatures ranging from 1900° C. to 2300° C. were employed as shown in TABLE 9, and testing the sintered products. The results are shown in TABLE 9. All of the samples showed a relative density exceeding 90%, a strength of at least 400 MPa at an ordinary room temperature, and a strength at a temperature of 1400° C. exceeding their strength at the room temperature, as is obvious from TABLE 9.

TABLE 8

| | Sample No. | C (parts by weight) | Excess C (parts by weight of B) | Relative density (%) | 4-point bending strength (MPa) | | K$_{1c}$ (MPa · m$^{\frac{1}{2}}$) |
|---|---|---|---|---|---|---|---|
| | | | | | In the air, room temp. | In vacuum, 1400° C. | |
| Example | 32 | 12.2 | 0 | 97.7 | 450 | 490 | 4.8 |
| | 33 | 12.7 | 0.5 | 98.4 | 530 | 570 | 4.9 |
| | 34 | 13.2 | 1.0 | 99.2 | 600 | 640 | 5.0 |
| | 35 | 14.2 | 2.0 | 99.4 | 600 | 670 | 5.0 |
| | 36 | 15.2 | 3.0 | 99.0 | 550 | 600 | 4.8 |
| | 37 | 17.2 | 5.0 | 92.4 | 430 | 470 | 4.4 |
| | 38 | 19.2 | 7.0 | 88.9 | 320 | 340 | not measured |

TABLE 9

| | Sample No. | Sintering temp. (°C.) | Sintering time (hr) | Relative density (%) | 4-point bending strength (MPa) | | K$_{1c}$ (MPa · m$^{\frac{1}{2}}$) |
|---|---|---|---|---|---|---|---|
| | | | | | In the air, room temp. | In vacuum, 1400° C. | |
| Example | 39 | 1900 | 10 | 91.3 | 400 | 420 | 4.3 |
| | 40 | 2000 | 10 | 98.0 | 510 | 560 | 4.8 |
| | 41 | 2100 | 4 | 98.4 | 580 | 630 | 5.0 |
| | 42 | 2150 | 4 | 99.3 | 590 | 660 | 5.0 |
| | 43 | 2200 | 1 | 98.9 | 450 | 500 | 5.1 |
| | 44 | 2300 | 1 | 99.0 | 420 | 470 | 5.1 |

EXAMPLE 10

A slurry was prepared by mixing 100 parts by weight of SiC, 26.0 parts by weight of a powder of TiC having an average particle diameter of 1.5 microns, 34.7 parts by weight of TiO$_2$, 25.3 parts by weight of B$_4$C and 2.0 parts by weight of carbon black with water. The method of EXAMPLE 9 was repeated for making a sintered product. It showed a relative density of 99.8%, a strength of 530 MPa at an ordinary room temperature and a K$_{JC}$ value of 5.6 MPa·m$^{\frac{1}{2}}$.

The sintered product was placed in a furnace containing an argon gas atmosphere and was subjected to HIP (hot isostatic pressing) treatment at a pressure of 200 MPa and a temperature of 1900° C. for an hour. The resulting product showed a relative density of 100%, a room temperature strength of 580 MPa and a K$_{JC}$ value of 5.6 MPa·m$^{\frac{1}{2}}$.

The mixture of raw materials was molded and the molded mixture was heat treated at a temperature of 1500° C. in a vacuum for four hours, whereby TiB$_2$ was precipitated to yield a composite SiC-TiB$_2$ material. It was sealed in a vacuum glass capsule and subjected to HIP treatment at a pressure of 200 MPa and a temperature of 1850° C. for an hour in an argon gas atmosphere to yield a sintered product. It showed a relative density of 95.6%, a room temperature strength of 420 MPa and a $K_{IC}$ value of 5.2 MPa·m$^{\frac{1}{2}}$.

EXAMPLE 11

A monoclinic $ZrO_2$ powder having an average particle diameter of 0.4 micron, a powder of $B_4C$ having an average particle diameter of 1.5 microns and a powder of carbon (carbon black) having an average particle diameter of 0.02 micron, of which the amounts are shown in TABLE 10 below, were mixed with 100 parts by weight of a powder of β-SiC having an average particle diameter of 0.3 micron in a ball mill using water as a mixing medium to prepare a slurry. The amounts of $B_4C$ and carbon were equal to the amounts giving a stoichiometric ratio as required for reducing $ZrO_2$ to form a boride, plus the amount of $B_4C$ supplying one part by weight of boron, and two parts by weight of carbon, respectively. The slurry was dried by a spray drier and the dry mixture was subjected to die pressing at a pressure of 300 kg/cm$^2$ and isostatic pressing at a pressure of 3000 kg/cm$^2$. The molded product was placed in a carbon-resistance furnace for firing at a temperature of 2100° C. in an argon gas atmosphere having a pressure of 1·atm. The firing was carried out by heating the molded product to 1500° C., while evacuating the furnace, holding it at that temperature for four hours, and raising the temperature, while introducing argon gas into the furnace in which the molded product was sintered at 2100° C. for four hours. The results are shown in TABLE 10.

For the sake of comparison, a sample in which no $ZrO_2$ had been added, and a sample in which a powder of $ZrB_2$ having an average particle diameter of four microns had been added were likewise prepared, sintered and tested. The results are also shown in TABLE 10.

All of the sintered products had a density which was at least equal to a theoretical density of 98%. All of Samples Nos. 45 to 49 according to this invention showed a strength which was higher than that of the comparative sample in which no $ZrB_2$ had been precipitated. Their strength did not drop even in a vacuum at a temperature of 1400° C., but showed an increase of 3 to 8%. They also showed a $K_{IC}$ value which was 30 to 140% higher than that of the comparative sample in which no $ZrB_2$ had been precipitated.

Samples Nos. 47 to 49 had an electrical resistivity not exceeding 0.1 ohm-cm and were easy of electro-discharge machining for wire cutting and die sinking.

Figure 7:
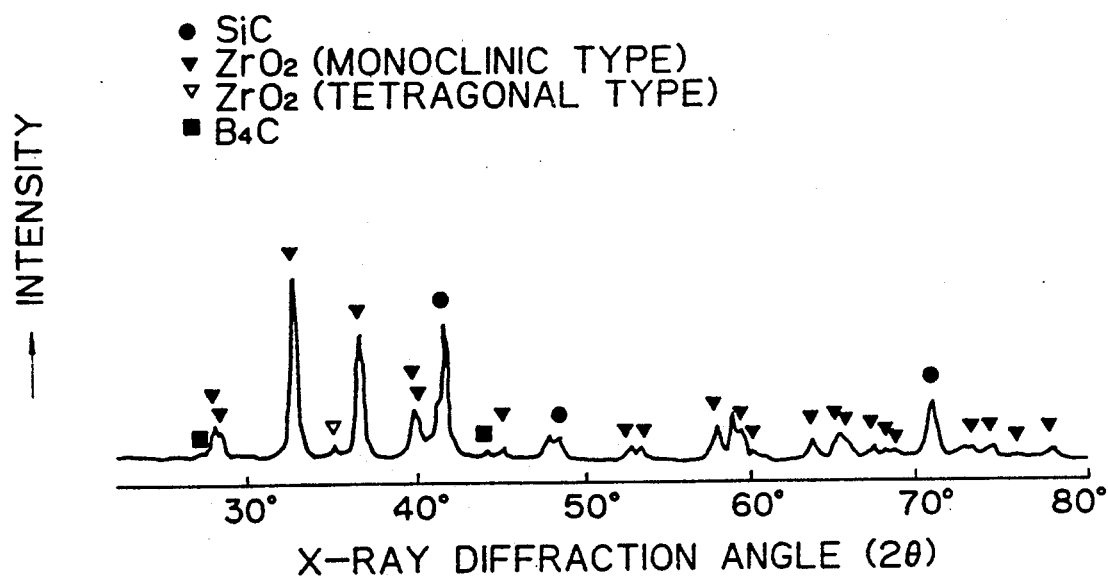
FIG. 7 is a chart showing the X-ray diffraction pattern of a mixed powder of SiC, $ZrO_2$, $B_4C$ and C in EXAMPLE 11.
Figure 8:
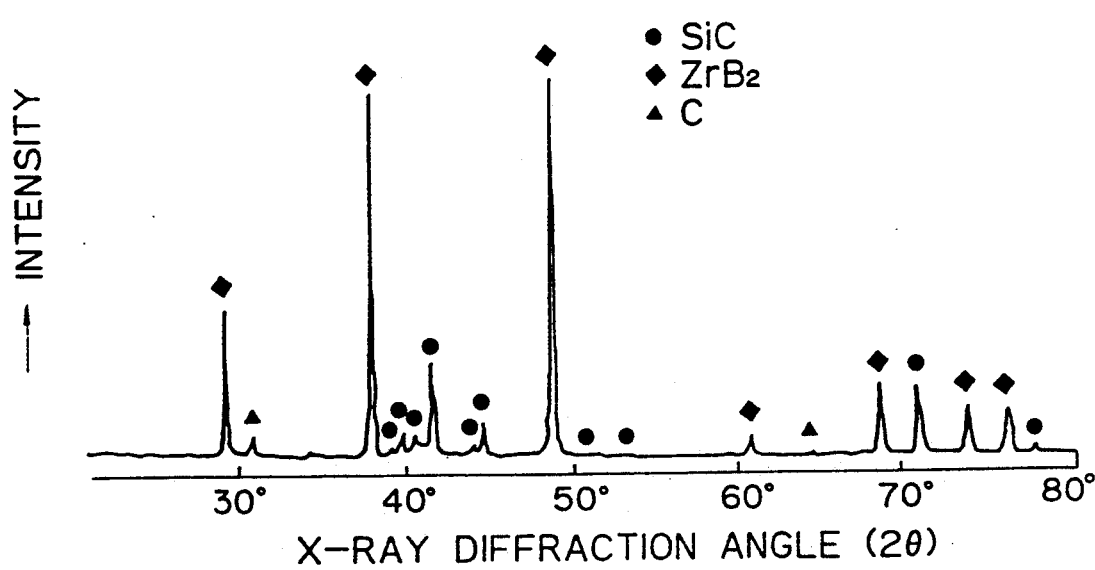
FIG. 8 is a chart showing the X-ray diffraction pattern of a sintered product of the mixed powder in EXAMPLE 11.

FIG. 7 is a chart showing the X-ray diffraction pattern of Sample No. 48 and FIG. 8 is a chart showing the X-ray diffraction pattern of the sintered product thereof. As is obvious therefrom, $ZrO_2$ was reduced and borided to form $ZrB_2$. Although the starting $ZrO_2$ was 100% monoclinic, a part thereof was transformed to tetragonal as the starting powders were mixed by ball-milling.

TABLE 10

| | Sample No. | SiC:ZrB$_2$ (vol. ratio) | ZrO$_2$ (parts by weight) | ZrB$_2$ (parts by weight) | B$_4$C (parts by weight) | C (parts by weight) | Relative density (%) | 4-point bending strength (MPa) In the air, room temp. | 4-point bending strength (MPa) In vacuum, 1400° C. | K$_{1c}$ (MPa·m$^{\frac{1}{2}}$) |
|---|---|---|---|---|---|---|---|---|---|---|
| Comparative Example | C8 | 100:0 | 0 | 0 | 1.3 | 2.0 | 98.0 | 450 | 500 | 2.8 |
| Example | 45 | 95:5 | 10.7 | 0 | 3.7 | 3.6 | 99.6 | 480 | 520 | 3.7 |
| | 46 | 90:10 | 22.6 | 0 | 6.4 | 5.3 | 99.5 | 580 | 600 | 4.3 |
| | 47 | 80:20 | 51.0 | 0 | 12.7 | 9.4 | 99.5 | 570 | 600 | 5.1 |
| | 48 | 70:30 | 87.3 | 0 | 20.8 | 14.8 | 99.4 | 550 | 570 | 5.8 |
| | 49 | 50:50 | 203.8 | 0 | 46.9 | 31.8 | 98.0 | 530 | 550 | 6.8 |
| Comparative Example | C9 | 70:30 | 0 | 80.0 | 1.3 | 2.0 | 93.2 | 360 | 330 | 4.5 |

EXAMPLE 12

A powder of monoclinic $ZrO_2$ having an average particle diameter of 0.4 micron, a powder of $B_4C$ having an average particle diameter of 1.5 microns and a powder of carbon black having an average particle diameter of 0.02 micron, of which the amounts are shown in TABLE 11 below, were mixed with 100 parts by weight of α-SiC having an average particle diameter of 0.7 micron in a ball mill using water as a mixing medium to prepare a slurry. Each amount of $B_4C$ as shown was equal to the amount as required to form $ZrB_2$ by reacting with $ZrO_2$, plus two parts by weight in terms of boron. The slurry was dried by filtration under suction, the dry mixture was crushed, and the resulting powder was molded by die pressing at a pressure of 300 kg/cm$^2$. The molded mixture was placed in a graphite mold for hot pressing at a pressure of 25 MPa and a temperature of 2100° C. for 30 minutes. The hot pressing was carried out by heating the mixture to 1500° C., while evacuating the furnace, holding it at that temperature for four hours, and raising the temperature, while introducing argon gas into the furnace, to continue the hot pressing in an argon gas atmosphere having a pressure of 1 atm.

For the sake of comparison, a sample in which no $ZrO_2$ had been added, and no $ZrB_2$ had, therefore, been formed, and a sample in which a powder of $ZrB_2$ having an average particle diameter of four microns had been added were likewise prepared and hot pressed.

TABLE 11

| | Sample No. | SiC:ZrB$_2$ (vol. ratio) | ZrO$_2$ (parts by weight) | ZrB$_2$ (parts by weight) | B$_4$C (parts by weight) | C (parts by weight) | Relative density (%) | 4-point bending strength (MPa) In the air, room temp. | 4-point bending strength (MPa) In vacuum, 1400° C. | K$_{1c}$ (MPa·m$^{\frac{1}{2}}$) |
|---|---|---|---|---|---|---|---|---|---|---|
| Comparative Example | C10 | 100:0 | 0 | 0 | 2.6 | 0 | 100 | 350 | 440 | 2.7 |
| Example | 50 | 95:5 | 10.7 | 0 | 5.0 | 1.6 | 100 | 420 | 460 | 3.5 |
| | 51 | 85:15 | 36.0 | 0 | 10.6 | 5.3 | 100 | 500 | 550 | 4.7 |

TABLE 11-continued

|  | Sample No. | SiC:ZrB$_2$ (vol. ratio) | ZrO$_2$ (parts by weight) | ZrB$_2$ (parts by weight) | B$_4$C (parts by weight) | C (parts by weight) | Relative density (%) | 4-point bending strength (MPa) | | K$_{1c}$ (MPa·m$^{\frac{1}{2}}$) |
|---|---|---|---|---|---|---|---|---|---|---|
|  |  |  |  |  |  |  |  | In the air, room temp. | In vacuum, 1400° C. |  |
|  | 52 | 70:30 | 87.3 | 0 | 22.1 | 12.8 | 99.8 | 480 | 520 | 5.8 |
|  | 53 | 50:50 | 203.8 | 0 | 48.2 | 29.8 | 98.6 | 440 | 470 | 6.3 |
| Comparative Example | C11 | 70:30 | 0 | 80.0 | 2.6 | 0 | 98.5 | 380 | 330 | 4.5 |

The hot pressed products were examined for properties. The results are shown in TABLE 11. All of Samples Nos. 50 to 53 according to this invention had a density exceeding a theoretical density of 98%. They had a strength which was higher than that of the comparative sample in which no ZrB$_2$ had been formed. Their strength did not drop even in a vacuum at a temperature of 1400° C., but showed an increase of 7 to 10%. They also showed a K$_{IC}$ value which was 30 to 130% higher than that of the comparative sample in which no ZrB$_2$ had been formed.

The samples in which at least 15% by volume of ZrB$_2$ had been formed (Samples Nos. 51 to 53) could be cut by electro-discharge machining.

EXAMPLE 13

The methods of EXAMPLE 12 were repeated for molding and sintering a mixture of raw materials which was equal in composition to Sample No. 51 of EXAMPLE 12 having a set SiC to ZrB$_2$ ratio by volume of 85:15, except that three different sets of hot pressing conditions were employed, as shown in TABLE 12 below. The hot pressed products were examined for properties. The results are shown in TABLE 12.

TABLE 12

|  | Sample No. | Hot pressing temp. and time | Relative density (%) | 4-point bending strength (MPa) | | K$_{1c}$ (MPa·m$^{\frac{1}{2}}$) |
|---|---|---|---|---|---|---|
|  |  |  |  | In the air, room temp. | In vacuum, 1400° C. |  |
| Example | 54 | 1800° C.; 4 h | 91.0 | 360 | 420 | 4.1 |
|  | 55 | 1900° C.; 1 h | 98.4 | 490 | 500 | 4.7 |
|  | 56 | 2000° C.; 1 h | 100 | 520 | 480 | 4.7 |

EXAMPLE 14

A powder of monoclinic ZrO$_2$ having an average particle diameter of 0.4 micron, a powder of rutile TiO$_2$ having an average particle diameter of 0.4 micron, a powder of B$_4$C having an average particle diameter of 1.5 microns and a powder of carbon black having an average particle diameter of 0.02 micron, of which the amounts are shown in TABLE 13 below, were mixed with 100 parts by weight of a powder of β-SiC having an average particle diameter of 0.3 micron by means of water in a ball mill to prepare a slurry. The amounts of TiO$_2$ and ZrO$_2$ were so selected that SiC and the boride, (Ti, Zr)B$_2$, which they would form might have a ratio by volume of 70:30. The amounts of B$_4$C and carbon black were so selected as to be equal to the amounts giving a stoichiometric ratio as required for reducing TiO$_2$ and ZrO$_2$ to form the boride, (Ti, Zr)B$_2$, plus one part by weight of B$_4$C in terms of boron, and two parts by weight of carbon, respectively.

The slurry was dried by a spray drier, and the dry mixture was molded by die pressing at a pressure of 300 kg/cm$^2$ and further by isostatic pressing at a pressure of 3000 kg/cm$^2$. The molded mixture was placed in a carbon-resistance furnace for firing at 2100° C. in an argon gas atmosphere having a pressure of 1 atm. The firing was performed by heating the mixture to 1500° C., while evacuating the furnace, holding it at that temperature for four hours, and raising the temperature, while introducing argon gas into the furnace in which the mixture was sintered at 2100° C. for four hours.

The toughness (K$_{IC}$ value) of each sintered product was determined by the IM method. All of the sintered products had a density exceeding a theoretical density of 98%. The boride, (Ti, Zr)B$_2$, as well as a small amount of graphite, was found in the matrix of SiC.

TABLE 13

|  | Sample No. | SiC:Boride (vol. ratio) | Parts by weight for 100 parts by weight of SiC | | | | Ti:Zr (mol ratio) | Relative density (%) | K$_{1c}$ (MPa·m$^{\frac{1}{2}}$) |
|---|---|---|---|---|---|---|---|---|---|
|  |  |  | TiO$_2$ | ZrO$_2$ | B$_4$C | C |  |  |  |
| Example | 57 | 70:30 | 61.1 | 8.0 | 24.7 | 17.3 | 90:10 | 99.0 | 5.7 |
|  | 58 | 70:30 | 45.5 | 30.1 | 23.7 | 16.6 | 70:30 | 99.3 | 5.8 |
|  | 59 | 70:30 | 31.2 | 48.1 | 22.8 | 16.1 | 50:50 | 99.4 | 5.8 |
|  | 60 | 70:30 | 18.0 | 64.7 | 22.0 | 15.5 | 30:70 | 99.1 | 5.8 |
|  | 61 | 70:30 | 5.8 | 80.1 | 21.2 | 15.0 | 10:90 | 99.2 | 5.8 |

All of Samples Nos. 57 to 61 according to this invention had an electrical resistivity not exceeding 0.1 ohm-cm and were easy of electro-discharge machining for wire cutting and die sinking.

EXAMPLE 15

Three samples of mixed powders were prepared by mixing a powder of TiC having an average particle diameter of 1.5 microns, a powder of monoclinic ZrO$_2$ having an average particle diameter of 0.4 micron, a powder of B$_4$C having an average particle diameter of 1.5 microns and a powder of carbon, of which the amounts are shown in TABLE 14 below, with 100 parts by weight of a powder of α-SiC having an average particle diameter of 0.4 micron. The method of EXAMPLE was repeated for making sintered SiC-based products in which (Ti, Zr)B$_2$ was dispersed, and determining the K$_{IC}$ values thereof. The results are shown in TABLE 14. As is obvious therefrom, the sintered products according to this invention had a K$_{IC}$ value which was higher than that of the sample in which no (Ti, Zr)B$_2$ had been formed (Sample No. C4 in TABLE 4).

Figure 9:
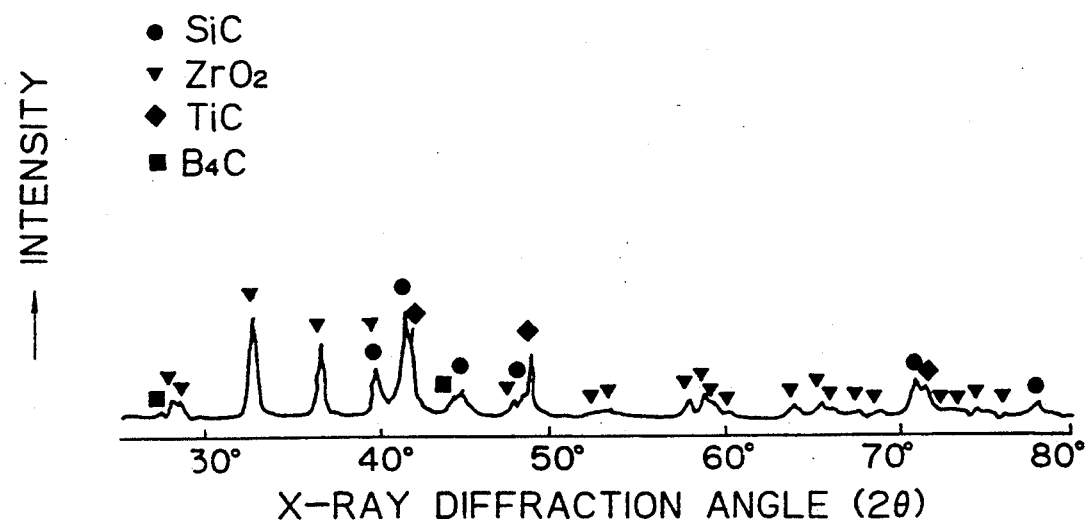
FIG. 9 is a chart showing the X-ray diffraction pattern of a mixed powder of SiC, TiC, $ZrO_2$, $B_4C$ and C in EXAMPLE 15.
Figure 10:
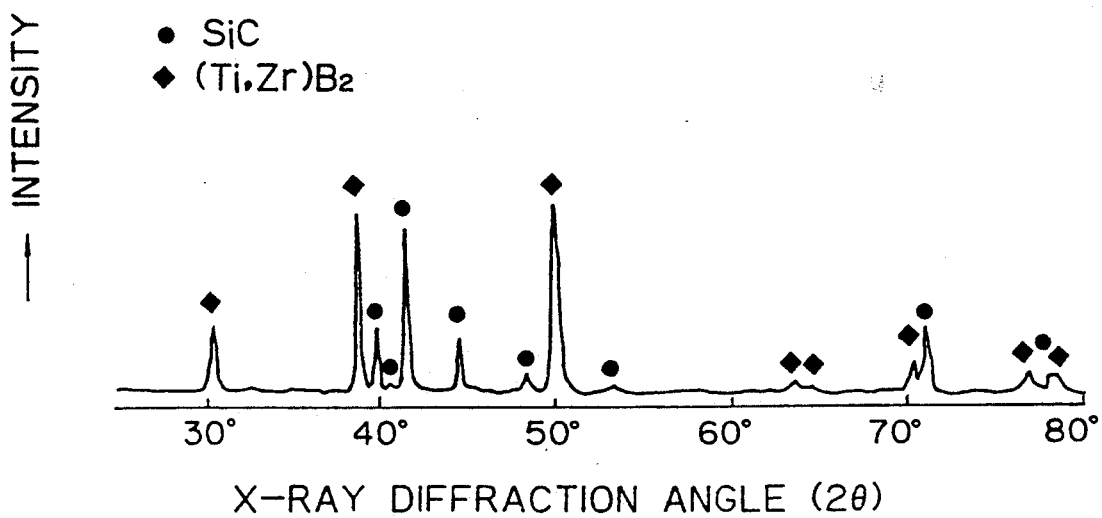
FIG. 10 is a chart showing the X-ray diffraction pattern of a sintered product of the mixed powder in EXAMPLE 15.

FIG. 9 is a chart showing the X-ray diffraction pattern of Sample No. 64 mixture and FIG. 10 is a chart showing the X-ray diffraction pattern of the sintered product thereof. As is obvious therefrom, the TiC, ZrO$_2$ and B$_4$C in the mixture reacted to form (Ti, Zr)B$_2$. No diffraction peak of carbon is seen in FIG. 9, as the carbon which was employed was amorphous.

EXAMPLE 16

A powder of TiC having an average particle diameter of 1.5 microns, a powder of monoclinic ZrO$_2$ having an average particle diameter of 0.4 micron and a powder of B$_4$C having an average particle diameter of 1.5 microns, of which the amounts are shown in TABLE 15 below, were mixed with 100 parts by weight of a powder of α-SiC having an average particle diameter of 0.7 micron by means of water in a ball mill to prepare a slurry. The amounts of TiC and ZrO$_2$ which were employed were in an equimolar relation to each other. The amount of B$_4$C was equal to that which was required for reacting with TiC and ZrO$_2$ to form (Ti, Zr)B$_2$ plus two parts by weight in terms of boron. The slurry was dried by filtration under suction. The dry mixture was crushed and the resulting powder was molded by die pressing at a pressure of 300 kg/cm$^2$. The molded mixture was placed in a graphite die for hot pressing at a temperature of 2100° C. and a pressure of 25 MPa for 30 minutes. The hot pressing was performed by heating the mixture to 1500° C., while evacuating the furnace, holding it at that temperature for four hours, and raising the temperature, while introducing argon gas into the furnace, to continue the hot pressing in an argon gas atmosphere having a pressure of 1 atm. Three samples of hot pressed products were, thus, obtained.

SiC and (Ti,Zr)B$_2$. All of them showed a K$_{IC}$ value which was higher than that of the SiC material not containing any (Ti, Zr)B$_2$. Samples Nos. 66 and 67 could be cut by electro-discharge machining.

EXAMPLE 17

A powder of Nb$_2$O$_5$ having an average particle diameter of one micron, a powder of B$_4$C having an average particle diameter of 1.5 microns and a powder of carbon black having an average particle diameter of 0.02 micron, of which the amounts are shown in TABLE 16 below, were mixed with 100 parts by weight of a powder of α-SiC having an average particle diameter of 0.4 micron by means of water in a ball mill to prepare a slurry. The amounts of B$_4$C and carbon which were employed were equal to those giving a stoichiometric ratio as required for reducing Nb$_2$O$_5$ to form a boride, plus one part by weight of B$_4$C in terms of boron, and two parts by weight of carbon, respectively. The slurry was dried by a spray drier and the dry mixture was molded by die pressing at a pressure of 300 kg/cm$^2$ and further by isostatic pressing at a pressure of 3000 kg/cm$^2$. The molded mixture was placed in a carbon-resistance furnace for firing at a temperature of 2150° C. in an argon gas atmosphere having a pressure of 1 atm. The firing was performed by heating the mixture to 1500° C., while evacuating the furnace, holding it at that temperature for four hours, and raising the temperature, while introducing argon gas into the furnace, in which the mixture was sintered at 2150° C. for four hours. Three samples of sintered products were, thus, prepared. The results are shown in TABLE 16.

For the sake of comparison, a sample in which no Nb$_2$O$_5$ had been added, and a sample in which a powder of NbB$_2$ having an average particle diameter of four microns had been added, were likewise prepared, sintered and tested. The results are also shown in TABLE 16.

All of Samples Nos. 68 to 70 according to this invention were composed of SiC, NbB$_2$ and a small amount of

TABLE 14

| Sample No. | SiC:(Ti,Zr)B$_2$ (vol. ratio) | Parts by weight for 100 parts by weight of SiC | | | | Relative density (%) | K$_{1c}$ (MPa · m$^{\frac{1}{2}}$) |
|---|---|---|---|---|---|---|---|
| | | TiC | ZrO$_2$ | B$_4$C | C | | |
| Example 62 | 95:5 | 2.9 | 5.9 | 3.9 | 1.8 | 99.4 | 3.5 |
| 63 | 90:10 | 6.1 | 12.5 | 6.9 | 1.8 | 99.2 | 4.0 |
| 64 | 70:30 | 23.4 | 48.1 | 22.8 | 1.8 | 99.0 | 5.8 |

TABLE 15

| Sample No. | SiC:(Ti,Zr)B$_2$ (vol. ratio) | Parts by weight for 100 parts by weight of SiC | | | Relative density (%) | K$_{1c}$ (MPa · m$^{\frac{1}{2}}$) |
|---|---|---|---|---|---|---|
| | | TiC | ZrO$_2$ | B$_4$C | | |
| Example 65 | 90:10 | 6.1 | 12.5 | 8.1 | 99.8 | 4.1 |
| 66 | 70:30 | 23.4 | 48.1 | 24.1 | 99.8 | 5.9 |
| 67 | 50:50 | 54.6 | 112.2 | 52.8 | 99.9 | 6.4 |

For the sake of comparison, a hot pressed product was likewise obtained from a mixture which had been prepared by adding only two parts by weight of B$_4$C in terms of boron to 100 parts by weight of SiC.

The products were examined for properties. The results are shown in TABLE 15. Samples Nos. 65 to 67 according to this invention were all found to have been densified substantially completely and be composed of carbon and had a density exceeding a theoretical density of 97%. These samples showed a strength which than that of the comparative sample in which no NbB$_2$ had been formed. They also showed a higher K$_{IC}$ value.

Samples Nos. 69 and 70 had an electrical resistivity not exceeding 0.1 ohm-cm and were easy of electro-discharge machining for wire cutting and die sinking.

TABLE 16

| Sample No. | SiC:NbB$_2$ (vol. ratio) | Parts by weight for 100 parts by weight of SiC | | | | Relative density (%) | 4-point bending strength at room temp. (MPa) | K$_{1c}$ (MPa·M$^{\frac{1}{2}}$) |
| --- | --- | --- | --- | --- | --- | --- | --- | --- |
| | | Nb$_2$O$_5$ | NbB$_2$ | B$_4$C | C | | | |
| Comparative Example C12 | 100:0 | 0 | 0 | 1.3 | 2.0 | 98.0 | 450 | 2.8 |
| Example 68 | 90:10 | 28.1 | 0 | 7.1 | 7.1 | 98.2 | 570 | 4.1 |
| 69 | 80:20 | 63.3 | 0 | 14.4 | 13.4 | 97.8 | 580 | 5.0 |
| 70 | 70:30 | 108.5 | 0 | 23.8 | 21.6 | 97.3 | 530 | 5.6 |
| Comparative Example C13 | 80:20 | 0 | 54.5 | 1.3 | 2.0 | 92.2 | 300 | 4.0 |

Figure 11:
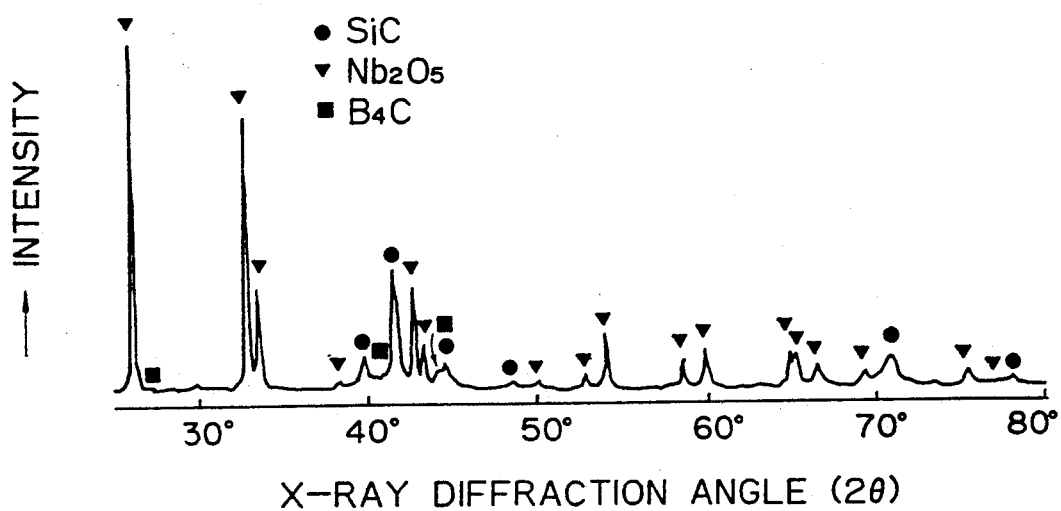
FIG. 11 is a chart showing the X-ray diffraction pattern of a mixed powder of SiC, $Nb_2O_5$, $B_4C$ and C in EXAMPLE 17.
Figure 12:
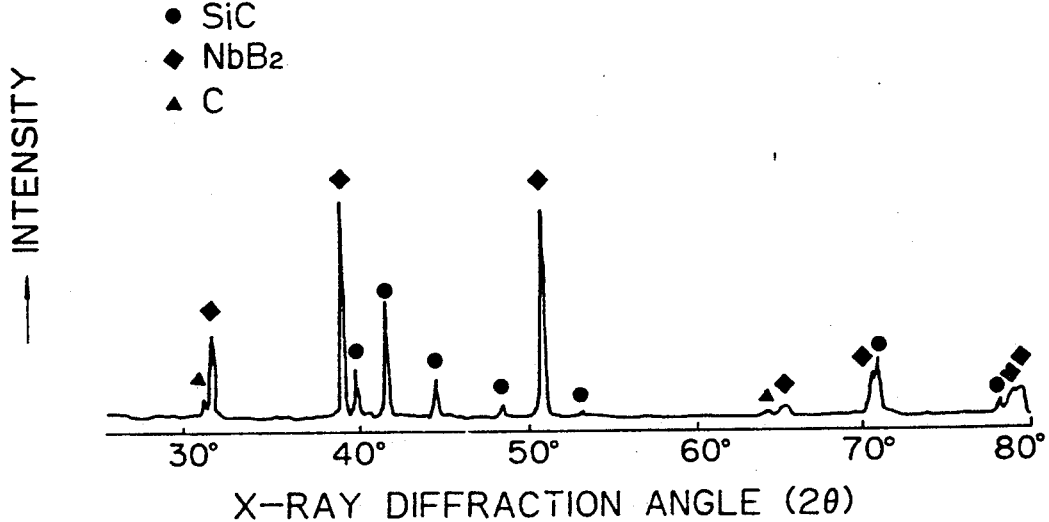
FIG. 12 is a chart showing the X-ray diffraction pattern of a sintered product of the mixed powder in EXAMPLE 17.

FIG. 11 is a chart showing the X-ray diffraction pattern of Sample No. 69 mixture and FIG. 12 is a chart showing the X-ray diffraction pattern of the sintered product thereof. As is obvious therefrom, Nb$_2$O$_5$ was reduced and borided to form NbB$_2$. No diffraction peak of carbon is seen in FIG. 11, as the carbon which was employed was amorphous.

EXAMPLE 18

Five samples of mixed powders were prepared by adding a powder of a substance or substances containing a Group Va or VIa metal element, a powder of B$_4$C and a powder of carbon black (for only three of the samples) to 100 parts by weight of a powder of α-SiC having an average particle diameter of 0.7 micron. The average particle diameters of the powders of V$_2$O$_5$, VC, Ta$_2$O$_5$, TaC, Cr$_2$O$_3$, MoO$_3$, WO$_3$, B$_4$C and carbon black were 1.2, 2, 1, 2, 1.5, 2, 2, 1.5 and 0.02 microns, respectively. The amounts of the metal element-containing substance or substances and B$_4$C were so selected that SiC and the metal diboride which they would form might have a ratio by volume of 80:20.

The method of EXAMPLE 16 was repeated for making a hot pressed product of each powder mixture, except that Samples Nos. 73 and 74 were heated at a temperature of 2050° C. for an hour.

EXAMPLE 19

A powder of monoclinic HfO$_2$ having an average particle diameter of 0.8 micron, a powder of B$_4$C having an average particle diameter of 1.5 microns and a powder of carbon black having an average particle diameter of 0.02 micron, of which the amounts are shown in TABLE 18 below, were mixed with 100 parts by weight of a powder of β-SiC having an average particle diameter of 0.3 micron by means of water in a ball mill to prepare a slurry. The amounts of B$_4$C and carbon which were employed were equal to those giving a stoichiometric ratio as required for reducing HfO$_2$ to form a boride, plus one part by weight of B$_4$C in terms of boron, and two parts by weight of carbon, respectively.

The slurry was dried by a spray drier and the dry mixture was molded by die pressing at a pressure of 300 kg/cm$^2$ and further by isostatic pressing at a pressure of 3000 kg/cm$^2$. The molded mixture was placed in a carbon-resistance furnace for firing at a temperature of 2100° C. in an argon gas atmosphere having a pressure of 1 atm. The firing was performed by heating the mixture to 1500° C., while evacuating the furnace, holding it at that temperature for four hours, and raising the temperature, while introducing argon gas into the furnace in which the mixture was sintered at 2100° C. for four hours. The results are shown in TABLE 18.

TABLE 17

| | Sample No. | Metal element-containing substance | Boron-containing substance | Carbon-containing substance | Boride formed | Relative density (%) | 4-point bending strength at room temp. (MPa) | K$_{1c}$ (MPa·m$^{\frac{1}{2}}$) |
| --- | --- | --- | --- | --- | --- | --- | --- | --- |
| Example | 71 | V$_2$O$_5$ + VC | B$_4$C | — | VB$_2$ | 98.7 | 530 | 4.9 |
| | 72 | Ta$_2$O$_5$ + TaC | " | — | TaB$_2$ | 98.8 | 550 | 5.0 |
| | 73 | CR$_2$O$_3$ | " | Carbon black | CrB$_2$ | 98.0 | 470 | 4.9 |
| | 74 | MoO$_3$ | " | " | MoB$_2$ | 98.5 | 490 | 5.0 |
| | 75 | WO$_3$ | " | " | W$_2$B$_5$ (WB$_2$) | 98.3 | 490 | 5.0 |

Each hot pressed product was found to contain a diboride as shown in TABLE 17. All of them showed a higher room temperature strength and a higher K$_{IC}$ value than those of the comparative sample (C10) in which no boride had been formed. Although the tungsten boride which had been formed in the sintered product of Sample No. 75 showed an X-ray diffraction peak corresponding to that of W$_2$B$_5$ (14H type) in "powder diffraction file" of Joint Committee on Powder Diffraction Standards, the wet analysis thereof revealed that it was closer to WB$_2$ in composition. Therefore, the boride is shown as W$_2$B$_5$(WB$_2$) in TABLE 17. The sintered product of Sample No. 74 was found to contain a small amount of Mo$_2$B$_5$ in addition to MoB$_2$.

All of Samples Nos. 76 to. 79 according to this invention were found to be composed of SiC, HfB$_2$ and carbon and have a density exceeding a theoretical density of 96%. These samples showed a strength which was higher than that of the comparative sample in which no HfB$_2$ had been formed. Their strength did not drop even in a vacuum at a temperature of 1400° C., but showed an increase of 4 to 8%. They also showed a K$_{IC}$ value which was 30 to 110% higher than that of the comparative sample in which no HfB$_2$ had been formed.

Samples Nos. 78 and 79 had an electrical resistivity not exceeding 0.1 ohm-cm and were easy of electro-discharge machining for wire cutting and die sinking.

TABLE 18

| | Sample No. | SiC:HfB$_2$ (vol. ratio) | HfO$_2$ (parts by weight) | HfB$_2$ (parts by weight) | B$_4$C (parts by weight) | C (parts by weight) | Relative density (%) | 4-point bending strength (MPa) | | K$_{1c}$ (MPa·m$^{\frac{1}{2}}$) |
|---|---|---|---|---|---|---|---|---|---|---|
| | | | | | | | | In the air, room temp. | In vacuum 1400° C. | |
| Comparative Example | C14 | 100:0 | 0 | 0 | 1.3 | 2.0 | 98.0 | 450 | 500 | 2.8 |
| Example | 76 | 95:5 | 19.5 | 0 | 3.8 | 3.7 | 99.4 | 490 | 530 | 3.7 |
| | 77 | 90:10 | 41.1 | 0 | 6.7 | 5.5 | 99.4 | 570 | 600 | 4.3 |
| | 78 | 80:20 | 92.5 | 0 | 13.4 | 9.9 | 99.3 | 550 | 570 | 5.1 |
| | 79 | 70:30 | 158.6 | 0 | 22.1 | 15.6 | 99.0 | 530 | 550 | 5.8 |
| Comparative Example | C15 | 70:30 | 0 | 150.7 | 1.3 | 2.0 | 92.1 | 320 | 300 | 4.4 |

What is claimed is:

1. A method of manufacturing a silicon carbide-based material in which a boride of at least one of Group IVa, Va and VIa elements of the periodic table is dispersed, comprising:
   mixing in water, a composition of raw materials which consists essentially of silicon carbide, a substance containing at least one of group IVa, Va and VIa elements except any boride thereof, any substance containing boron except any of the borides of group IVa, VA and VIa elements, wherein the amount of said substance containing boron is 3.7–58.5 parts by weight of said raw materials; and
   firing said composition, thereby reacting said substance containing at least one of group IVa, Va and VIa elements and said substance containing boron to form a boride of at least one of group IVa, Va and VIa elements.

2. A method as set forth in claim 1, wherein said composition of raw materials further comprises at least one of carbon and an organic compound which produces carbon as a result of thermal decomposition.

3. A method as set forth in claim 1, wherein said silicon carbide is in the form of a powder having an average particle diameter up to and including one micron.

4. A method as set forth in claim 1, wherein said substance containing at least one of Group IVa, Va VIa elements is at least one selected from the group consisting of the oxides, carbides and nitrides of said elements, the solid solutions of said oxides, carbides and nitrides, the compounds of said oxides, carbides and nitrides, the compounds and solid solutions which said oxides, carbides and nitrides form with silicon compounds, the compounds and solid solutions which said oxides, carbides and nitrides form with aluminum compounds, and the salts, alkoxides and organic substances which produce said oxides, carbides and nitrides as a result of thermal decomposition.

5. A method as set forth in claim 1, wherein said substance containing boron is at least one selected from the group consisting of boron, boron carbide, boron nitride, boron oxide and carboranes.

6. A method as set forth in claim 1, wherein said substance containing at least one of Group IVa, Va and VIa elements and said substance containing boron are each in the form of a powder having an average particle diameter up to and including 10 microns.

7. A method as set forth in claim 2, wherein said substance containing at least one of Group IVa, Va and VIa elements is an oxide or precursor of an oxide of said elements.

8. A method as set forth in claim 2, wherein said organic compound is at least one selected from the group consisting of phenolic resins, coal tar pitch and furan resins.

9. A method as set forth in claim 1, wherein said composition further contains a sintering additive.

10. A method as set forth in claim 1, further including molding said composition before it is fired.

11. A method as set forth in claim 10, said molding is carried out by at least one method selected from the group consisting of slip casting, injection molding, extrusion, die pressing, isostatic pressing, dough pressing and a method employing a doctor blade.

12. A method as set forth in claim 1, wherein said firing is carried out in a vacuum or in a nonoxidizing atmosphere.

13. A method as set forth in claim 1, wherein said firing is carried out by pressureless sintering at a temperature of 1900° C. to 2300° C.

14. A method as set forth in claim 1, wherein said firing is carried out by hot pressing at a temperature of 1800° C. to 2300° C.

15. A method as set forth in claim 1, wherein said firing is carried out by pressureless sintering or hot pressing, and further by isostatic pressing at a temperature of 1700° C. to 2200° C.

16. The method of claim 1, wherein the mixing ratio of the composition of raw materials is as follows when the boride of at least one of Group IVa, Va and VIa elements has the formula MxBy:
   said silicon carbide=100 parts by weight,
   said substance containing at least one of Group IVa, Va and VIa elements=$1.64x \cdot d_B \cdot M_m/M_B$ to $31.2x \cdot d_B \cdot M_m/M_B$ parts by weight in terms of said at least one element, and
   said substance containing boron=$0.2 + 17.7$ $yd_B/M_B$ to $8 + 336$ $yd_B/M_B$ parts by weight in terms of boron, wherein M is at least one Group IVa, Va or VIa element; x and y are integers; $M_B$ is the molecular weight of the boride; $d_B$ is density of the boride, and $M_m$ is the atomic weight of M.

17. The method of claim 4, wherein said substance containing at least one of Group IVa, Va and VIa elements is a mixture of oxides of said elements and carbides of said elements.

18. A method as set forth in claim 2, wherein said substance containing at least one group IVa, Va, and VIa element is a double oxide or precursor of a double oxide of said element.

* * * * *